(12) United States Patent
Austin, III et al.

(10) Patent No.: US 11,590,901 B1
(45) Date of Patent: Feb. 28, 2023

(54) SYSTEM AND METHOD FOR MOUNTING STRUCTURES TO A VEHICLE

(71) Applicant: Adrian Steel Company, Adrian, MI (US)

(72) Inventors: Earl Richard Austin, III, Milan, MI (US); Mark Anthoney Henry, Jr., Adrian, MI (US); Joshua Merle Rogers, Manitou Beach, MI (US); Thomas Michael Willis, Petersburg, MI (US); Kyle Jeffery Lakatos, Clayton, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 17/663,244

(22) Filed: May 13, 2022

Related U.S. Application Data

(60) Provisional application No. 63/262,392, filed on Oct. 12, 2021, provisional application No. 63/187,987, filed on May 13, 2021.

(51) Int. Cl.
  B60R 11/00 (2006.01)
  B60P 1/64 (2006.01)

(52) U.S. Cl.
  CPC ............ B60R 11/00 (2013.01); *B60P 1/64* (2013.01); *B60R 2011/0036* (2013.01)

(58) Field of Classification Search
  CPC ..... B60R 11/00; B60R 2011/0036; B60P 1/64
  USPC .................................................... 296/24.44
  See application file for complete search history.

(56) References Cited

U.S. PATENT DOCUMENTS

| | | | |
|---|---|---|---|
| 4,505,509 A | 3/1985 | Simeri et al. | |
| 5,306,064 A | 4/1994 | Padovano et al. | |
| 6,270,138 B1 * | 8/2001 | Laskowski | B60P 3/14 296/24.44 |
| 6,585,306 B1 * | 7/2003 | Smith | B60P 1/00 296/24.44 |
| 6,848,732 B2 | 2/2005 | Green | |
| 7,401,849 B2 | 7/2008 | McClure et al. | |
| 7,648,187 B2 | 1/2010 | Hoffman et al. | |
| 7,784,885 B2 | 8/2010 | Steiger et al. | |
| 8,408,638 B2 | 4/2013 | Pencak et al. | |
| 8,414,046 B2 | 4/2013 | Pencak et al. | |
| 8,414,066 B2 | 4/2013 | Hustyi et al. | |
| 8,449,022 B2 | 5/2013 | Pencak et al. | |
| 8,944,483 B2 | 2/2015 | Richter | |
| 9,033,083 B2 | 5/2015 | Kashiwagi | |
| 9,173,486 B2 | 11/2015 | Richter | |
| 9,540,049 B2 | 1/2017 | Karube et al. | |

(Continued)

FOREIGN PATENT DOCUMENTS

| | | |
|---|---|---|
| WO | 2002090172 A2 | 11/2002 |
| WO | 2018188220 A1 | 10/2018 |

*Primary Examiner* — Pinel E Romain
(74) *Attorney, Agent, or Firm* — Marshall & Melhorn, LLC

(57) ABSTRACT

A system and method for mounting structures to a vehicle may include providing an anchor point; the anchor point may have of an anchor point aperture in a structural member. The system and method may also include securing a plate to the anchor point by aligning an aperture in an anchor flange of the plate with the anchor point aperture. The system and method may also include locating a fastener through the anchor flange aperture and the anchor point aperture to secure the plate to the anchor point.

27 Claims, 24 Drawing Sheets

(56) References Cited

U.S. PATENT DOCUMENTS

| | | |
|---|---|---|
| 9,616,940 B2 | 4/2017 | Ito et al. |
| 9,637,026 B2 | 5/2017 | Cardone et al. |
| 9,714,054 B2 | 7/2017 | Heacox et al. |
| 9,783,079 B2 | 10/2017 | Cardone et al. |
| 10,052,974 B2 | 8/2018 | Cardone et al. |
| 10,189,508 B2 | 1/2019 | Dupper |
| 10,202,149 B1 | 2/2019 | Johnson et al. |
| 10,207,746 B2 | 2/2019 | Yang et al. |
| 10,730,563 B2 | 8/2020 | Niggemann et al. |
| 10,773,754 B2 | 9/2020 | Heacox et al. |
| 2009/0284035 A1 | 11/2009 | Ruther |
| 2011/0006562 A1 | 1/2011 | Campbell et al. |
| 2011/0233965 A1 | 9/2011 | Oka |
| 2014/0305980 A1* | 10/2014 | Every ............... B60R 11/00 224/539 |
| 2014/0341634 A1* | 11/2014 | Chatwin ............ B60R 11/00 403/11 |
| 2019/0009835 A1 | 1/2019 | D'Amico |
| 2020/0102020 A1 | 4/2020 | Fujisawa |

\* cited by examiner

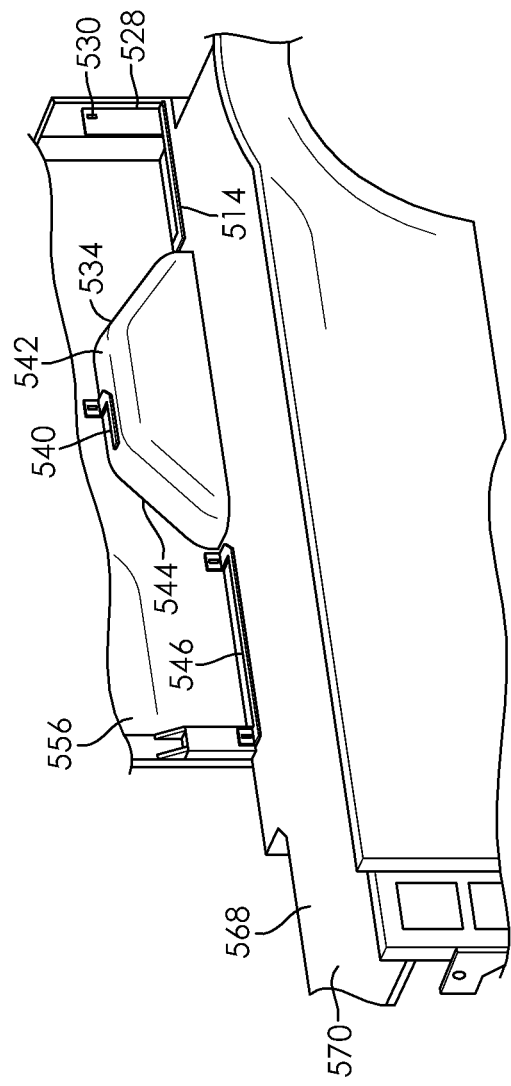
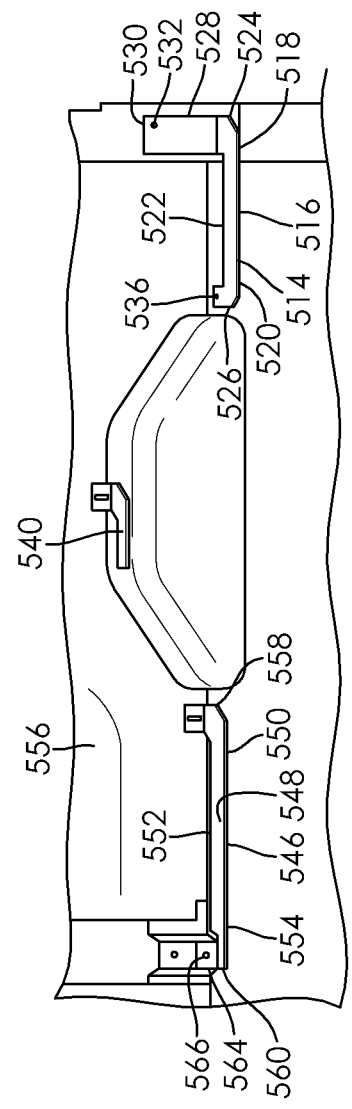
FIG. 11
FIG. 12

SYSTEM AND METHOD FOR MOUNTING STRUCTURES TO A VEHICLE

FIELD

Disclosed herein is a system and method for mounting structures to a vehicle without negatively impacting the structural integrity of the vehicle or risking interference with electrical components.

BACKGROUND

It is known to add storage-type equipment to vehicles, such as utility and working vehicles, to adapt them to specific applications. For example, a trades-person may have a cargo-type van equipped with shelving, cabinets, drawers and other items designed to carry and store the various tools, equipment and parts needed for a general or particular task. Typically, the storage-type equipment is located within the interior of the vehicle, such as in the cargo portion. The shelving, cabinets, drawers and other items might be broadly termed organizational applications.

In many cases, the prior art organizational applications must be secured to the vehicle for stability and safety reasons. However, in order to secure them to the vehicle, it requires modification of the vehicle, such as drilling, cutting, etc. which can negatively impact the structural integrity of the vehicle, make it more susceptive to corrosion/rust and cause the re-sale value of the vehicle to decrease. In addition, with the introduction of electric and electric-hybrid vehicles, modification of the vehicle may result in both safety and liability issues. For example, electric and electric-hybrid vehicles carry batteries, or a battery pack, for the vehicle traction system, as well as other associated electrical components and wiring. In some cases, the voltage and amperage associated with the batteries, components and wiring can be very high and it could be very dangerous for a worker to come in contact with them while attempting to install and secure the organizational application. Further, even if the voltage/amperage is low, if one of these components is comprised with a drill or otherwise cut, it can negatively affect the component performance and void the warranty.

In view of the problems with the prior art, it would be advantageous for a system that permits organizational applications and the like to be safely mounted and secured to the vehicle without drilling, or cutting, the vehicle.

SUMMARY

In one aspect, a method for mounting structures to a vehicle may include the following steps:
providing an anchor point, the anchor point may be comprised of an anchor point aperture in a structural member;
securing a plate to the anchor point by aligning an aperture in an anchor flange of the plate with the anchor point aperture; and
locating a fastener through the anchor flange aperture and the anchor point aperture to secure the plate to the anchor point.

In another aspect, the method may be that the fastener is threaded into the anchor point aperture.

In another aspect, an upper surface of the plate may be located below the anchor point aperture when the anchor flange aperture is aligned with the anchor point aperture.

In another aspect, a lower surface of the plate may be placed in direct facing contact with an upper surface of a floor, and a lower surface of the floor is on an exterior of the vehicle.

In another aspect, the anchor flange may be angled with respect to the upper surface of the plate to align with the structural member in which the anchor point aperture is located.

In another aspect, may be attaching an organizational application to an upper surface of the plate such that no attachment device from the organizational application extends through a floor.

Another aspect may be a method for mounting structures to a vehicle with the following steps:
providing at least one anchor point, the anchor point comprised of a threaded anchor point aperture in a structural member of the vehicle and a threaded anchor located within the aperture;
removing the threaded anchor from the aperture;
locating a plate having an upper and a lower surface on a floor deck of the vehicle so that the lower surface is in direct facing contact with an upper surface of the floor deck;
aligning an aperture in an anchor flange on the plate with the anchor point aperture; and
locating a threaded fastener through both the anchor point aperture and the anchor flange aperture to secure the plate to the anchor point.

In another aspect, a method for mounting structures to a vehicle may have the following steps:
providing a plurality of anchor points in a plurality of structural members, the anchor points each comprised of an anchor point aperture, wherein the plurality of anchor points are coplanar with one another;
locating a first plate having a substantially planar upper surface and a substantially planar lower surface on a floor deck so that the lower surface is in direct facing contact with an upper surface of the floor deck, and the upper surface of the first plate is below the plurality of anchor points;
locating a second plate having a substantially planar upper surface and a substantially planar lower surface on the floor deck so the upper and lower surfaces of the second plate are substantially coplanar with the first plate;
aligning an aperture in an angled anchor point flange on each plate with one of the anchor point apertures; and
connecting each plate with one of the anchor points by locating a fastener through each anchor point flange aperture into a respective anchor point aperture.

In another aspect, a system for mounting structures to a vehicle may have an anchor point in a structural member of the vehicle, the anchor point having an anchor point aperture. The system may also have a plate having an upper surface and a lower surface. The system may also have an anchor flange extending at an angle with respect to the upper surface, the anchor flange having an anchor flange aperture therein, wherein the anchor flange aperture is aligned with the anchor point aperture. The system may also have a fastener extending through the anchor flange aperture and the anchor point aperture to secure the plate to the anchor point.

In another aspect, the plate may have substantially planar upper and lower surfaces that define a substantially constant thickness between them along the plate.

In another aspect, the lower surface of the plate may be located in direct facing contact with an upper surface of a floor of the vehicle, wherein a lower surface of the floor is on an exterior of the vehicle.

In another aspect, the lower surface of the plate may be coplanar with the upper surface of the vehicle floor.

In another aspect, the plate terminates at the lower surface and the anchor flange extends above the upper surface.

In another aspect, the plate, or any structure located through the plate, does not extend into the floor.

In another aspect, the upper and lower surfaces of the plate may be solid and continuous.

In another aspect, the plate may be one-piece, unitary and integrally formed.

In another aspect, the anchor point aperture may have a first set of threads and the fastener has a second set of threads complementary to the first set of threads In another aspect, the anchor flange may be located on a rear edge, a side edge or a front edge of the plate.

In another aspect, the plate may have a single anchor flange.

In another aspect, the plate may have an inner side edge and outer side edge.

In another aspect, an intersection of the inner side edge with an upper surface of a floor may be a straight line.

In another aspect, the inner and outer side edges may be parallel one another.

In another aspect, the inner side edge may be adjacent a side wall of the vehicle.

In another aspect, the inner edge may be partially curvilinear and partially straight.

In another aspect, a foot of an organizational application may rest on the upper surface of the plate, the foot may be attached to the plate such that no attachment devices from the foot to the plate extend into a layer below the lower surface of the plate.

In another aspect, a system for mounting structures to a vehicle may have an anchor point in each of two structural members, each anchor point may have an anchor point aperture. The system may also have a first plate having an upper surface and a lower surface, the lower surface located in direct facing contact with an upper surface of a floor deck of the vehicle. The system may also have a second plate having an upper surface and a lower surface, the lower surface may be located in direct facing contact with the upper surface of the floor deck of the vehicle, the second plate may be coplanar with the first plate. The upper surfaces of the first plate and the second plate may be located below the anchor points at a substantially equal distance. The system may also have a first anchor flange extending at a first angle with respect to the upper surface of the first plate, the first anchor flange having an anchor flange aperture therein. The first anchor flange aperture may be aligned with one anchor point aperture. The system may also have a second anchor flange extending at a second angle with respect to the upper surface of the second plate. The second anchor flange may have an anchor flange aperture therein. The first angle may be different than the second angle. The second anchor flange aperture may be aligned with one anchor point aperture. A fastener may extend through each anchor flange aperture and each anchor point aperture to secure each respective plate to the respective anchor point.

In another aspect, a first foot of an organizational application may rest on the upper surface of the first plate and a second foot of the organizational application may rest on the upper surface of the first plate. The feet may be attached to the plate such that no attachment devices from the feet to the plate extend into the floor.

In another aspect, a first foot of an organizational application may rests on the upper surface of the first plate and a second foot of the organizational application may rest on the upper surface of the second plate. The feet may be attached to the plates such that no attachment devices from the feet to the plates extend into the floor.

In another aspect, a third plate may have an upper and a lower surface, wherein the lower surface is located on an upper surface of a wheel well, the third plate may have a third anchor flange extending at a third angle with respect to the upper surface, the third anchor flange may have an anchor flange aperture therein, the anchor flange may be aligned with an anchor point aperture a third structural member, and a fastener may extend through the anchor flange aperture and each anchor point aperture to secure the third plate to the anchor point.

BRIEF DESCRIPTION OF THE FIGURES

FIG. 11 is an upper, side perspective view of the mounting solution from FIG. 9;

FIG. 12 is another view of the mounting solution from FIGS. 9 and 11;

DETAILED DESCRIPTION OF THE PREFERRED EMBODIMENTS

It is to be understood that the system and method may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting.

First Embodiment

Figure 1:
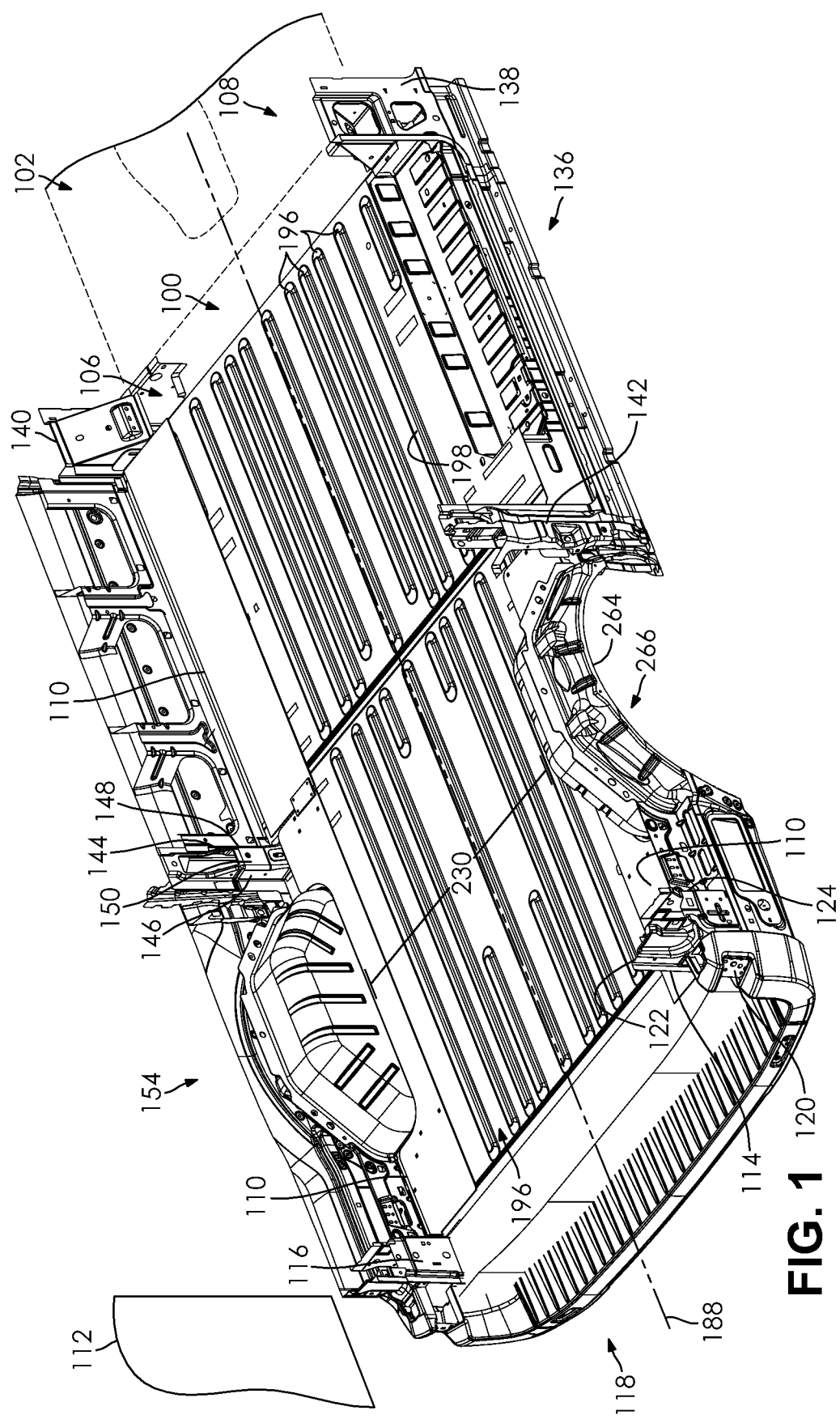
FIG. 1 is an upper, rear perspective view of one embodiment of a cargo-type vehicle with one embodiment of a mounting solution.

Turning now to FIG. 1, one embodiment of a partial vehicle interior 100 is depicted. In this embodiment, the vehicle 102 is a cargo van where the walls, side door/doors, rear doors, and roof are not shown but the floor 104 is partially depicted. Further, the cargo 106 and passenger compartment areas 108 are depicted as largely empty. While one embodiment of a cargo vehicle 102 is depicted in the Figures, the mounting solution 110 described herein is not limited to only this vehicle 102, but instead, it can be used with a wide variety of vehicles and applications.

The cargo area 106 may be such as the area within the vehicle 102 approximately from where the rear doors (not shown) would be to the passenger area 108. The rear doors are mounted to first and second D-pillars 114, 116, which are part of the vehicle 102. The rear doors and the D-pillars 114, 116 may define one end of the cargo area 106. One embodiment of one of the D-pillars 114, 116 is depicted in FIG. 1.

As can be appreciated from FIG. 1, the D-pillars 114, 116 may define the opening 118 providing access from the rear doors to the cargo area 106. Generally, both D-pillars 114, 116 define a door side portion 120, a flange portion 122 and cargo side portion 124. Each door side portion 120 may be adapted to receive a door therein, and the flange portion 122 may connect the door side portion 120 with the cargo side portion 124. The D-pillars 114, 116 also add shape and strength to the vehicle cargo area 106, and may help support the side walls and the roof.

Each cargo side portion 124 and/or flange portion 122 of the D-pillars 114, 116 may define a plurality of openings and/or apertures. The vehicle manufacturer originally provides these openings/apertures. In some cases, the openings/apertures are used to provide access to vehicle lighting, interior trim attachment options and for other access and attachment options. These openings may be referred to as pre-located, original openings 126.

In one embodiment, an anchor device 128 may be located in one of the openings 126 by the vehicle manufacturer. The actual shape, size and utility of the anchor device 128 varies, but it may be such as a D-ring that is secured within the opening 126.

In another embodiment, one end of a grab handle (not shown) is located within one of the openings 126 in one or more D-pillar 114, 116. The actual shape and size of the grab handle may vary, but it may be such as a generally C-shaped handle that is secured to a D-pillar 114, 116.

Ideally, the anchor device 128 is removed from a D-pillar 114, 116, which provides access to the pre-located, original openings 126 in the vehicle D-pillar 114, 116. Similarly, the grab handle is removed from the D-pillar 114, 116, which also provides access to the pre-located, original openings 126 in the vehicle D-pillar 114, 116. Of course, if neither the anchor device 128 or the grab handle are present, there is no need to remove them to provide access to the openings 126. Even if the anchor devices 128 and/or handle are not provided by the vehicle manufacturer, the manufacturer will still provide openings 126 in the D-pillar 114, 116 to accommodate them. These openings 126 may be used as noted below.

Moving forward from the rear doors and the first and second D-pillars 114, 116 are first and second side walls 130, 132 as can be appreciated from FIG. 1. The side walls 130, 132 may be parallel one another and may be of equal height and shape. The side walls 130, 132 extend from the vehicle floor 104 to the vehicle roof (not shown). The side walls 130, 132, roof and floor 104 may further define the cargo area 106.

As shown in FIG. 1, the side walls 130, 132 may be supported by one or more ribs 134. Generally, the ribs 134 may run from the floor 104 (or a wheel well) to the roof. The ribs 134 may add shape and strength to the side walls 130, 132, and help support the roof. Each may rib 134 define a plurality of slots therein. The slots add strength and reduce weight of the ribs 134.

As may be appreciated from FIG. 1, in the exemplary vehicle, there may be a side door on a curb side 136 of the vehicle 102. The side door may be defined and framed by a B-pillar 138 and a C-pillar 142, as shown in FIG. 1. The vehicle 102 may be provided with one or more B and C-pillars 138, 142 regardless whether there is a side door or not. Opposite B 140 and C-pillars 144 may be located on the opposite side of the vehicle 102. The B and C-pillars 138, 140, 142, 144 may also add shape and strength to the vehicle cargo area 106, and help support side walls 130, 132 and the roof.

Each C-pillar 142, 144 may be comprised of a rear facing wall 146, a forward facing wall 148 and an intermediate wall 150. The rear facing wall 146 primarily faces a rear of the vehicle 102, while the forward facing wall primarily faces a front of the vehicle 102. The intermediate wall 150 is located between the forward facing wall 148 and the rear facing wall 146; the intermediate wall 150 extends transverse the forward facing wall 148 and rear facing wall 146, which may be generally parallel one another.

In the depicted embodiment, any of the C pillar walls 146, 148, 150, including the intermediate wall 150, may be provided with a plurality of pre-located original openings 152. Typically, these openings 152 are used to provide access to exterior lighting, interior trim attachment options and for other access and attachment options.

In one embodiment, an anchor device 128 may be located in one of the openings 152 on each of the B and/or C-pillars 138, 140, 142, 144. The actual shape, size and utility of the anchor device varies, but it may be such as a D-ring that is secured within the opening 152. Ideally, the anchor device 128 is removed from both C-pillars 142, 144, which provides access to the pre-located, original openings in the vehicle C-pillars 142, 144. In other embodiments, an anchor device 128 is not located in the original openings 152, but the opening 152 is still provided by the vehicle manufacturer. In that case, no removal step is needed.

One of the side doors may be movably attached to the curb side C-pillar 142. The other side door may be movably attached to the vehicle B-pillar 138. The B-pillar 138 may also define the cargo area 106 from the passenger area 105 of the vehicle 102. On a street side 154 of the vehicle 102, the side wall 132 continues from the C-pillar 144 to the street side B-pillar 140. The B-pillars 138, 140 add shape and strength to the vehicle cargo area 106 and passenger area 108, and help support the side walls 130, 132 and the roof.

While pre-located, original openings 126, 152, which may or may not be associated with anchor devices, are noted as being associated the B, C and/or D pillars 138, 140, 144, 114, 116, other locations are possible. By way of example only, it is common that the vehicle manufacturer will include such openings on ribs 134 or other robust supports for the side walls 130, 132, the floor 104 or other features. If anchor devices are located in such openings, it may be preferred that the anchor devices are removed to provide access to the pre-located, original openings that housed the anchor devices. As noted above, there may instances where a vehicle manufacturer won't locate anchor devices in an opening but instead the opening will be provided unobstructed. The method and devices described herein works equally well in these situations.

Figure 5:
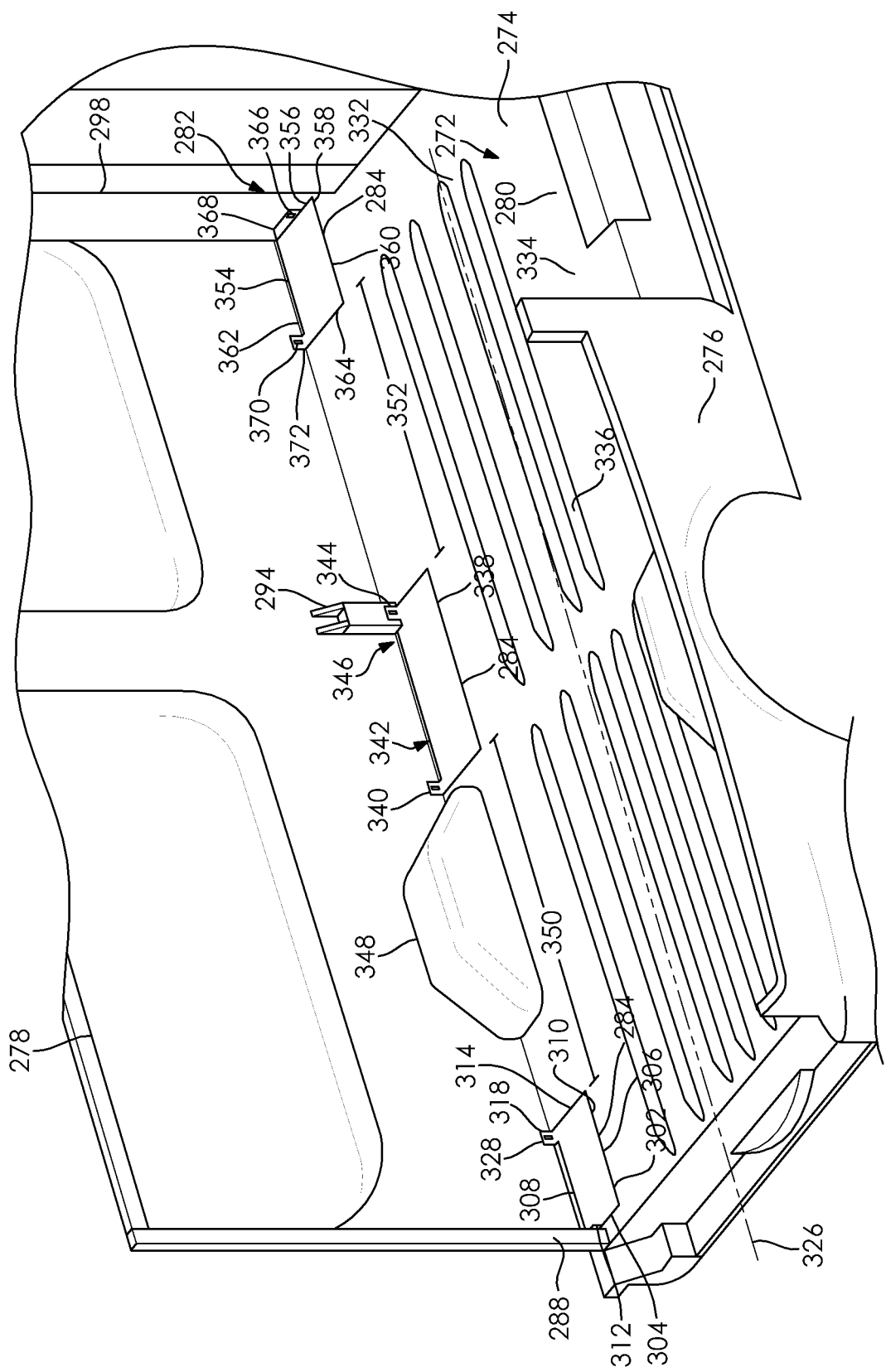
FIG. 5 is an upper, rear perspective view of one embodiment of a cargo-type vehicle with another embodiment of a mounting solution on the street side of the vehicle.

Turning to FIGS. 1 and 5, one may observe the floor 104 of the vehicle 102. Beneath the floor 104 is a typical location for one or more batteries or battery packs (not shown) for an electric or hybrid electric vehicle. Thus, it may be important to avoid cutting or drilling into the floor 104 to avoid any disturbance to, or contact with, the batteries, battery packs and/or their associated components, including, but not limited to, wiring and/or electronics, with which the present solutions agrees.

In order to locate and install the organizational accessories, a rear street side plate 156 may be provided. The plate 156 may be unitary, one-piece and integrally formed, or it may be comprised of one or more pieces.

The plate 156 may have planar upper and lower surfaces 158, 160 where the two surfaces 158, 160 define a constant thickness between them. Thus, except as noted below, the plate 156 may exist in a single plane. The plate 156 may have an outboard edge (e.g., streetside) 162 and an inboard edge (opposite the outboard edge) 164 further defining the thickness. The inboard edge 164 may be linear and continuous from a rear edge 166 to a front edge 168. The plate 156 may terminate at each of the edges 166, 168. The outboard edge 162 may define a curvilinear path that may be complementary to the side wall 132 and a wheel well 170 for the street side rear wheel (not shown). The outboard edge 162 may abut these features 132, 170 or there may be a substantially constant gap 172 between the edge 162 and these structures 132, 170. In one embodiment, a rear portion 174 and a forward portion 176 of the outboard edge 162 may be substantially linear, while an intermediate portion 178 may be curved to accommodate the wheel well 170. This may result in the plate 156 having a C-shaped outboard edge 162.

The plate 156 may have one or more anchor flanges 180, 182 connected thereto. In one embodiment, the anchor flanges 180 182 may be unitary, integrally formed and one-piece with the plate 156. In other embodiments, one or more of the anchor flanges 180, 182 may be separately connected or attached to the plate 156. It may be preferred that the anchor flanges 182, 182 have the same thickness as the rest of the plate 156. The flanges 180, 182 may have upper and lower surfaces 184, 186 that are substantially parallel one another.

The anchor flanges 180, 182 are preferably positioned on the plate 152 so that they align with the pre-located, original openings 126, 152. By way of example, a first anchor flange 180 may be located on the rear edge 166 to align with a pre-located, original opening 126 in the street side D-pillar 116. Continuing the example, a second anchor flange 182 may be located on the outboard edge 162 of the plate 156 to align with a pre-located, original opening 152 on the street side C-pillar 144. In some embodiments, the pre-located original openings 126, 152 may be co-planar with one another.

In one embodiment, the anchor flanges 180, 182 may be such as tabs extending from the plate 156 at an angle. The extension angle may vary by location to match the angled surface in which the pre-located, original openings 126, 152 are located. For example, the first anchor flange 180 on the rear edge 166 of the plate 156 may extend approximately transverse to the primary direction of the plate 156. The primary direction of the plate 156 may be parallel to a longitudinal axis 188 of the vehicle 102.

The second anchor flange 182 on the outboard edge 162 of the plate 156 may extend from the plate 156 at an acute angle. In some cases, an angle other than as noted above may be needed so that an anchor flange 182 has a complementary angle to the pillar or other structure with the pre-located, original openings 152.

Each anchor flange 180, 182 may have an aperture 190 extending therethrough. Fasteners 192 may be located through the first and second anchor apertures 190 into the pre-located, original openings 126, 152 to secure and locate the plate 152. The fasteners 192 may be such as threaded fasteners that are received within pre-located, original openings 126, 152 that are threaded in a complementary threaded fashion. In some embodiments, no other structure is used to secure the plate 156 to the floor 104, or any floor structure. Thus, the floor 104 and/or the floor structure is not moved, disturbed, drilled or otherwise compromised from its original installation position and/or condition.

The rear street side plate 156 may be located directly over the floor 104. In some embodiments, the lower surface 160 of the plate 156 may be in direct face-to-face contact with an upper surface 194 of the floor 104 with no intervening structures or space. The floor 104 may be entirely planar, or it may have structures, such as ribs 196. In the case where ribs 196 are used, the lower surface 160 of the plate 156 may be in direct, face-to-face contact with an upper surface 198 of the ribs 196. Thus, the plate 156 may be substantially parallel the floor 104, on the upper surface 198 of the ribs 198. The other plates described herein, except where noted otherwise, may be in the same arrangement with the floor 104.

Figure 2:
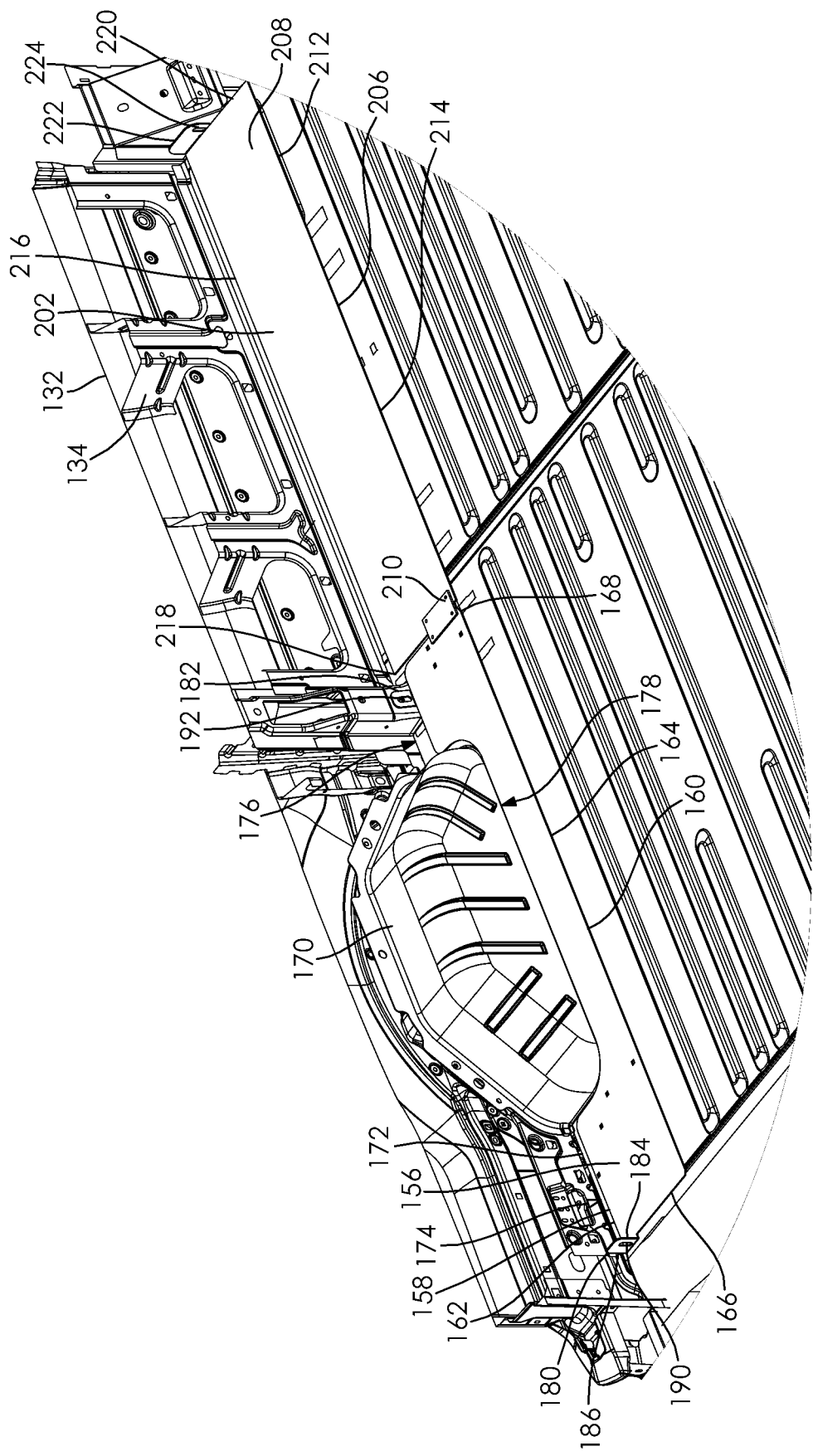
FIG. 2 is a partial, upper, perspective view of a street side floor of the cargo portion of a vehicle with a mounting solution thereon.

With continued reference to FIGS. 1 and 2, a transition plate 200 is depicted connecting the rear street side plate 156 and a front street side plate 202. The transition plate 200 may have an upper surface 204 and a lower surface 206 defining a constant thickness between them, where the lower surface 206 may be in direct contact with the upper surfaces 158 of both plates 156, 202. Mechanical fasteners 210 may be located through the transition plate 200 into both side plates 156, 202 to secure them together. In most cases, the mechanical fasteners 210 will not extend into the vehicle floor 104 for the reason noted above. The transition plate 200 may extend only a portion of the width of the plates 156, 202 and may only be a fraction of the length of the plates 156, 202.

The front street side plate 202 may have substantially planar upper and lower surfaces 208, 212 separated by a constant thickness. Thus, except as noted below, the plate 202 may exist in a single plane. The upper surface 208 may be parallel and co-planar with the upper surface 158 of the rear street side plate 156. In some embodiments, the plate 202 may be in direct contact with the floor 104 with no intervening structures, as noted above. The plate 202 may be unitary, one-piece and integrally formed, or it may be comprised of one or more pieces.

The plate 202 may have an inboard and outboard edge 214, 216 further defining the plate 202. The edges 214, 216 may be linear and continuous from a rear edge 218 to a front edge 220 of the plate 202, thus the edges 218, 220 may be parallel one another. The plate 202 may have the same, or substantially the same, width as the rear street side plate 156. In some embodiments, the rear edge 128 of the front street side plate 202 may abut a front edge 168 of the rear street side plate 156, or they be separated by a gap. Further, while a separate front street side plate 202 and a rear street side plate 156 are depicted the plates 202, 156 may be formed as a single piece where the single plate still possesses the features of the front and rear street side plates 202, 156 noted above. The outboard edge 216 may directly abut the street side wall 132, or a substantially constant gap may separate the edge 216 with the wall 132. The plate 202 may terminate at each of the edges 214, 216, 218, 220.

The front street side plate 202 may have an anchor flange 222 on the front edge 220 of the plate 202. The anchor flange 222 may be as described above or it may have a different size and shape. In one embodiment, best seen in FIG. 2, the front edge anchor flange 222 may extend transverse the primary direction of the plate 202, which may be parallel the longitudinal axis 188 of the vehicle 102. Further, the front edge anchor flange 222 may extend a quarter to a half of the width of the front edge 220 of the plate 202. This may be to accommodate a side of the B-pillar 140. An aperture 224 may be located in the anchor flange 222.

The anchor flange 222 may have the same thickness as the rest of the plate 202. The flange 222 may be formed from two opposite surfaces that are substantially parallel one another.

The anchor flange 222 may be positioned on the plate 202 to align with a pre-located, original opening 152 in the B-pillar 140. This opening 152 may be co-planar with the openings 126, 152 for the rear street side plate 156.

Fasteners 226 may be located into the anchor flange aperture 224 and into the pre-located, original opening 152 in the street side B-pillar 140 to secure and locate the front street side plate 202 in place.

As with the rear street side plate 156, no other structures are used to secure the plate 202 to the floor 104, or any floor structure. Thus, here also the floor 104 and/or floor structure is not moved, disturbed, drilled or otherwise compromised from its original installation position and/or condition.

Figure 3:
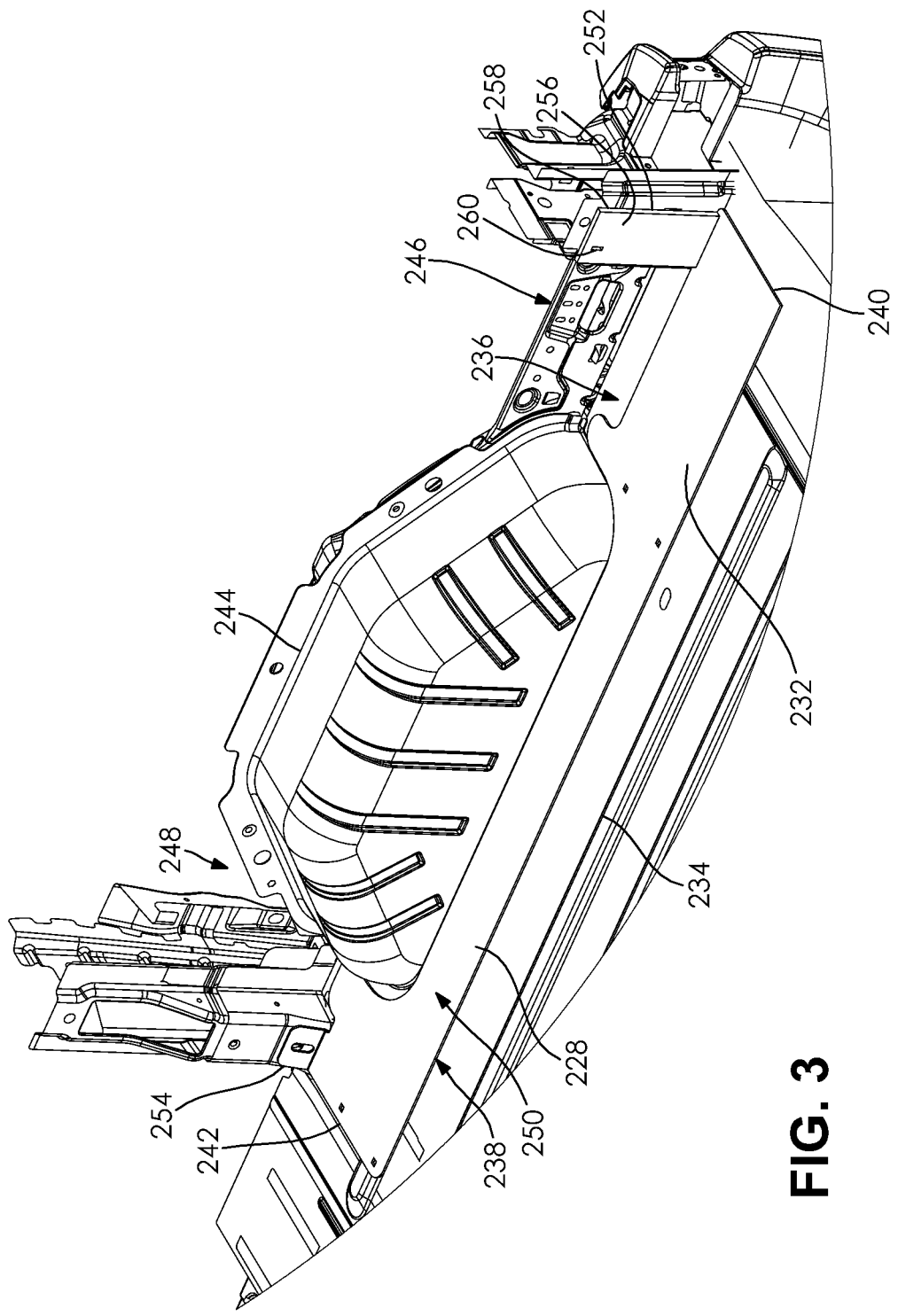
FIG. 3 is a partial, upper, perspective view of a curb side floor with one embodiment of a mounting solution thereon.

Looking now at FIGS. 1 and 3, one embodiment of a rear curb side plate 228 located directly over the floor 104 is provided. A gap 230 between the rear curb side plate 228 and the rear street side plate 156 where no additional related plates are located may exist. In some embodiments, the rear curb side plate 228 may be in direct contact with the floor 104 with no intervening structures. The plate 228 may be unitary, one-piece and integrally formed, or it may be comprised of one or more pieces.

The plate 228 may have substantially planar upper and lower surfaces 232, 234 where the two surfaces 232, 234 define a constant thickness between them. Thus, except as noted below, the plate 228 may exist in a single plane. The upper surface 232 may be parallel and co-planar with the upper surface 158, 208 of the rear street side plate 156 and the front street side plate 202. The lower surface 234 of the plate 228 may be in direct contact with the floor 104 or any floor structure as noted above.

The plate 228 may have an outboard edge (or curb side) 236 and an opposite inboard edge 238 further defining the thickness. The inboard edge 238 may be linear and continuous from a rear edge 240 to a front edge 242. The plate 228 terminates at the edges 236, 238, 240, 242. The outboard edge 236 may define a curvilinear path that may be complementary to the side wall 130 as well as a wheel well 244 for the curb side rear wheel (not shown). The outboard edge 236 may directly abut the side wall 130 and/or wheel well 244 or a substantially constant gap may separate them. The outboard edge 236 may also have a recess to accommodate vehicle components, which for an electric or electric-hybrid vehicle may be such as an inverter.

In one embodiment, a rear portion 246 and a forward portion 248 of the outboard 236 edge may be substantially linear, while an intermediate portion 250 located between the portions may be curved to accommodate the wheel well 244. This may result in the plate having a C-shaped outboard edge 236.

The plate 228 may have one or more anchor flanges 252, 254 connected thereto. In one embodiment, the anchor flanges 252, 254 may be unitary, integrally formed and one-piece with the plate 228. In other embodiments, one or more of the anchor flanges 252, 254 may be separately connected or attached to the plate 228. It may be preferred that the anchor flanges 252, 254 both have the same thickness as the rest of the plate 228. Each flange 252, 254 may have respective first and second surfaces 256, 258 that are parallel one another.

The anchor flanges 252, 254 are preferably positioned on the plate 228 so that they align with the pre-located, original openings 126, 152. By way of example, a first anchor flange 252 may be located on the rear portion 246 of the outboard edge 236 to align with a pre-located, original opening 126 in the curb side D-pillar 120. In some embodiments, the pre-located, original opening 126 may be left by a grab bar which has been removed from the D-pillar 120. The first anchor flange 252 may extend substantially transverse the primary direction of the plate 228, which may be parallel the longitudinal axis 188 of the vehicle 102. The first anchor flange 252 may have a height greater than the other anchor flange 254

Continuing the example, a second anchor flange 254 may be located on the outboard edge 236 of the plate 228 to align with a pre-located, original opening 152 on the street side C-pillar 144.

In one embodiment, the second anchor flange 254 may be such as a tab that extends from the plate 228 at an angle. The extension angle may vary by location to match the angled surface in which the pre-located, original openings 126, 152 are located. For example, the second anchor flange 254 on the outboard edge 236 of the plate 228 may extend from the plate 228 at an acute angle. In some cases, an angle other than 90 degrees may be needed so that an anchor flange 254 has a complementary angle to the pillar 142 or other structure. The pre-located, original openings 126, 152 may be co-planar with one another. In some embodiments, no other structure is used to secure the plate 228 to the floor 104, or any floor structure. Thus, the floor 104 and/or the floor structure is not moved, disturbed, drilled or otherwise compromised from its original installation position and/or condition.

Each of the anchor flanges 252, 254 may have fastener apertures 260. Fasteners 262 may be located through the apertures 260 in the first and second anchor flange 252, 254 into the pre-located, original openings 126, 152 to secure and locate the plate 228.

In some embodiments, the pre-located, original openings 126, 152 for a grab bar may be aligned with the apertures 260 in the anchor flanges 252, 254. Thus, fasteners 262 may extend through both the grab bar and the anchor flanges 252, 254 to secure them both to the same pre-located, original openings 126, 152.

In selected embodiments, in all, if not most, instances, the upper surfaces 158, 208, 232 of the plates 156, 202, 228 may be located below the respective pre-located, original opening 126, 152 when the anchor flange aperture 190, 224, 260 is aligned with the pre-located, original opening 126, 152, which may also be designated anchor point aperture(s). In such embodiments, it may be that the anchor point, and more preferably their apertures 126, 152 that will be used for the plates 156, 202, 228, are all coplanar with one another. It may also be in these embodiments that the upper surfaces 158, 208, 232 of the plates 156, 202, 228 are all located as a substantially equal distance from the anchor point apertures 126, 152.

In certain embodiments, it may also be that all of the lower surfaces 160, 212, 234 of the plates 156, 202, 228 are located in direct facing contact with the upper surface 194 of the floor 104, wherein a lower surface 264 of the floor 104 is on an exterior 266 of the vehicle 102. In such embodiments, the lower surfaces 160, 212, 234 of the plates 156, 202, 228 may be substantially coplanar with the upper surface 194 of the floor 104. It may be in these situations that the plates 156, 202, 228 terminates at their lower surfaces 160, 212, 234 with no structures extending below the lower surfaces 160, 212, 234, while the anchor flanges 180, 182, 222, 224, 252, 254 on the plates 156, 202, 228 may extend above the upper surfaces 158, 208, 232 of the plates 156, 202, 228.

Figure 4:
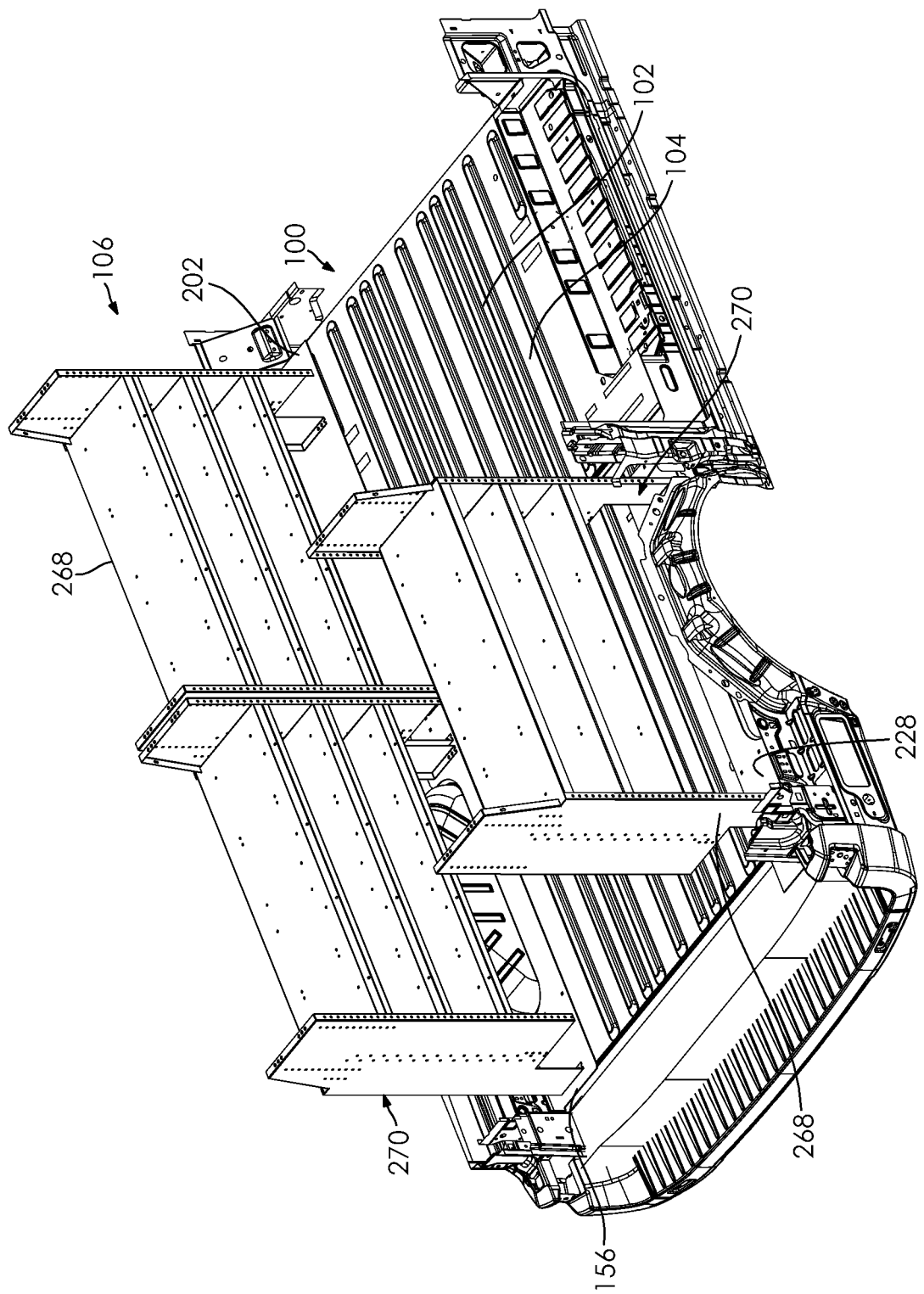
FIG. 4 is a partial, upper, perspective view of an interior of a vehicle with a mounting solution on the floor and organizational applications located on the mounting solution.

Turning now to FIG. 4, one embodiment of organizational applications 268 is depicted located on the plates 158, 208, 323. The organizational applications 268 in the depicted embodiment are shelving units, but other applications may be used instead, or in combination with the shelving units. Further, while a certain number of shelving units are depicted, fewer units, or units of different sizes, shapes and designs may be used.

The organizational applications 268 may have floor support portions 270 that directly contact the plates 158, 208, 232. The portions 270 may be such as feet of the shelving units that rest directly on the upper surfaces 158, 208, 232 of the plates 156, 202, 228. Mechanical fasteners (not shown) may be located through the feet and into the plates 156, 202, 228 to secure the shelving units in place. The present device ensures that the fasteners do not interfere with the floor 104, or anything below the floor 104.

The plates 156, 202, 228 may be all constructed of a material that provides a robust and secure base and securing structure to the vehicle 102. In one embodiment, the plates 156, 202, 228 may be constructed of metal, such as steel and/or aluminum alloys. Other materials such as composite materials, fiberglass, polymers and/or wood may also be used together or in combination with one another.

Second Embodiment

Turning now to FIG. 5, another embodiment of a partial vehicle interior 272 is depicted. In this embodiment, the vehicle 274 is a cargo van where the side door/doors, rear doors, and roof are not shown, but the side walls 276, 278, and floor 280 are partially shown. Further, the cargos areas 282 are depicted as largely empty. While one embodiment of a cargo vehicle 274 is depicted in the Figures, the mounting solution 284 described herein is not limited to only this vehicle 274, but instead, it can be used with a wide variety of vehicles and applications.

Figure 6:
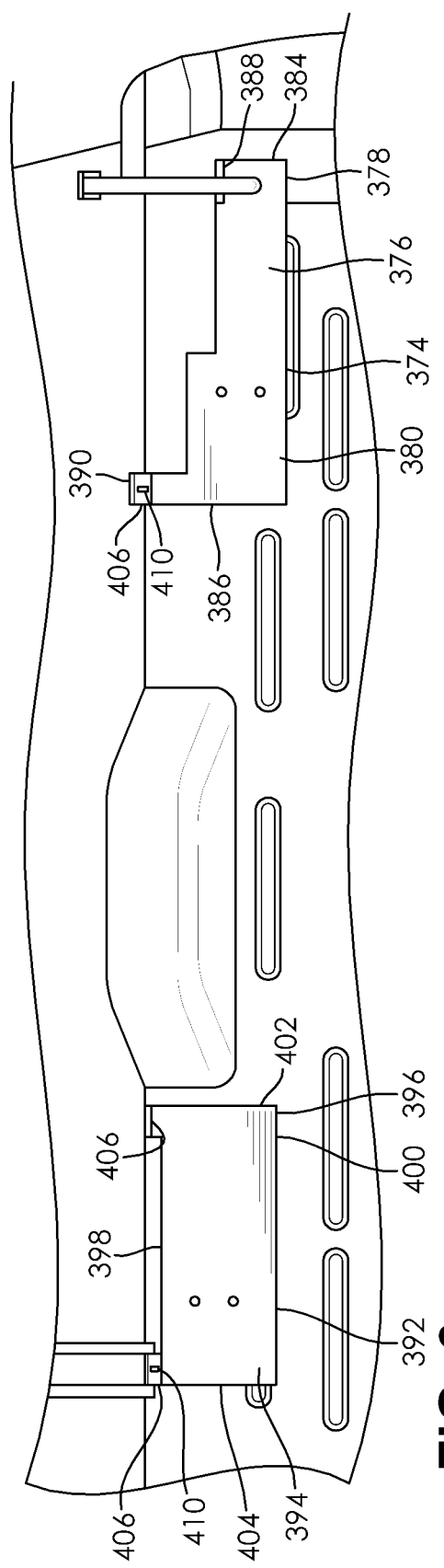
FIG. 6 is an upper view of a curb side floor with one embodiment of a mounting solution thereon.
Figure 7:
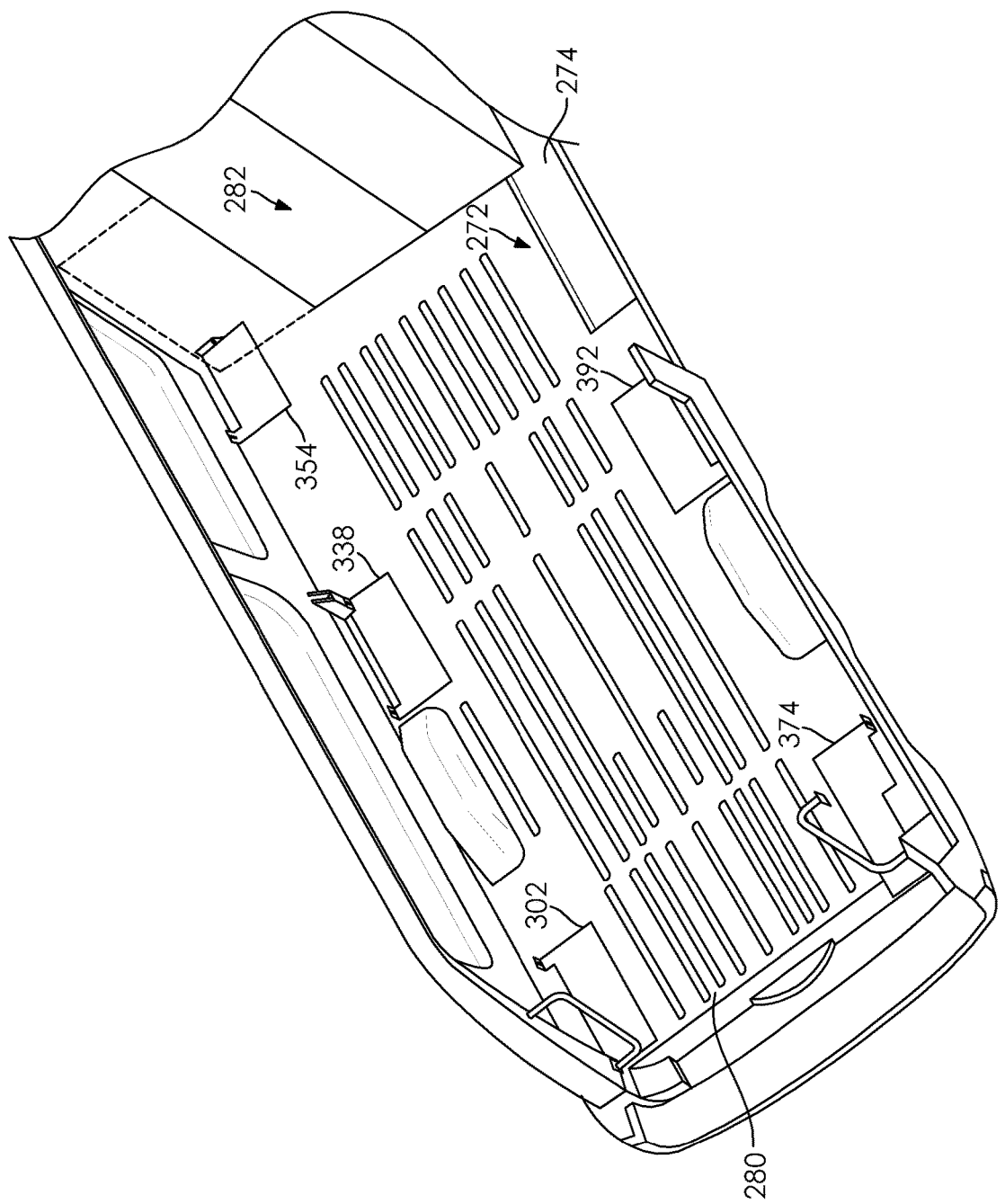
FIG. 7 is an upper view of a vehicle with one embodiment of a curb side and a street side a mounting solution thereon.

The cargo area 282 may be such as the area within the vehicle 274 from the rear doors to the passenger compartment. The rear doors are mounted to first and second D-pillars 286, 288 as noted above. One embodiment of one of the D-pillars 286, 288 is depicted in FIGS. 6 and 7. The D-pillars 286, 288 serve the same purpose here as noted above, and may have the same fasteners.

The D-pillars 286, 288 may define a plurality of manufacturer provided openings and/or apertures 126. The openings 126 may have anchor devices and the handles as noted above, or not. These structures may be treated also as noted above.

Figure 8:
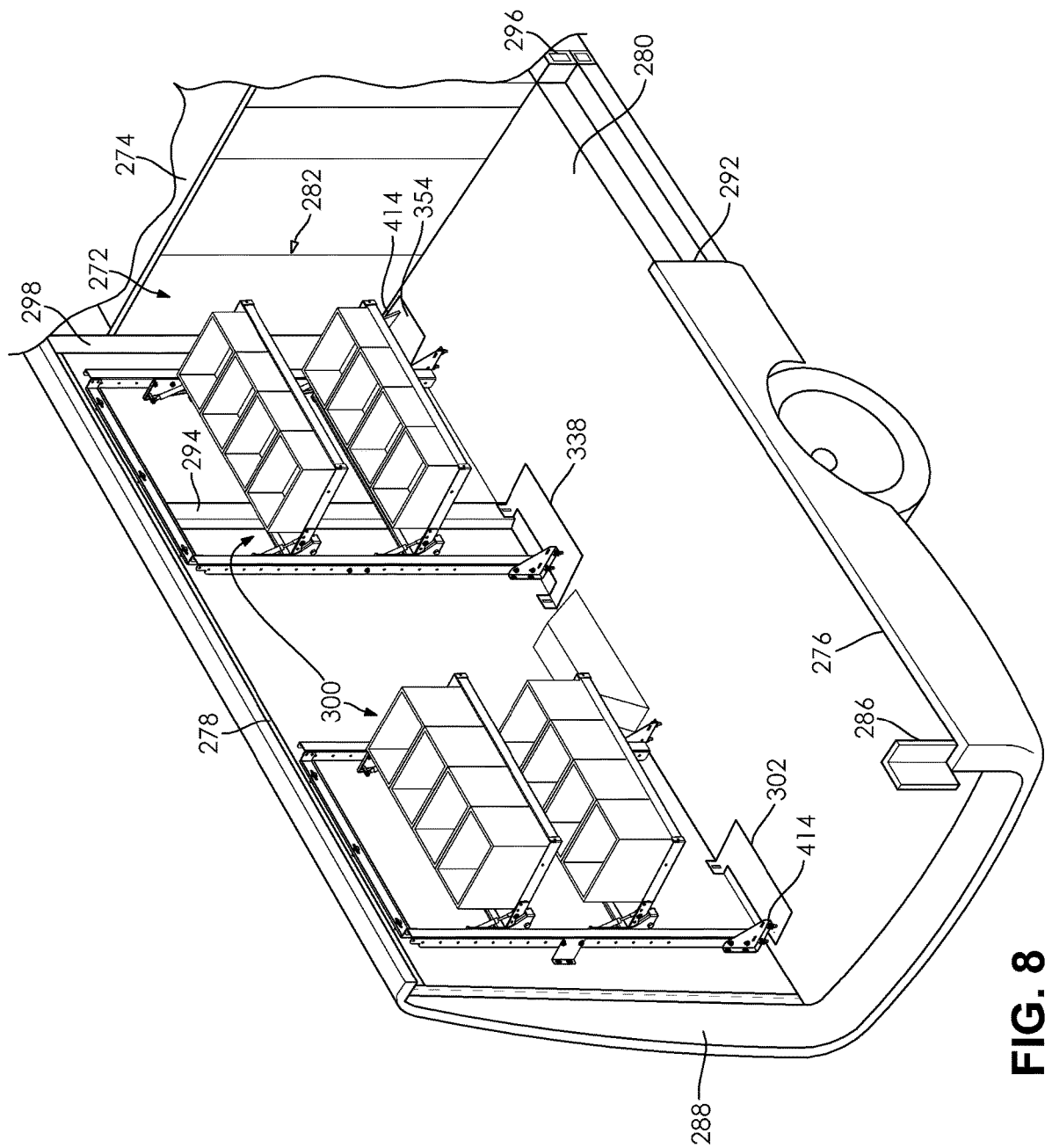
FIG. 8 is a partial, upper, perspective view of an interior of a vehicle with one embodiment of a mounting solution on the floor and organizational applications located on the mounting solution.

Moving forward from the rear doors and the first and second D-pillars 268, 288 are the first and second side walls 276, 278, as can be appreciated in FIGS. 7 and 8. The side walls 276, 278 may be as noted above.

As may be appreciated from FIG. 7, in the exemplary vehicle 274, there may be a side door (not shown) on the curb side of the vehicle 274. The side door may be defined and framed by one or more C and B-pillars 292, 296, as shown in FIG. 7. The vehicle 274 may be provided with one or more C and B-pillars 292, 296 regardless whether there is a side door or not. Opposite C and B-pillars 294, 298 may be located on the opposite, or street, side of the vehicle 274. The B and C pillars 292, 294, 296, 298 may function as noted above and have the noted features.

Any of the C-pillar walls or the B-pillar walls may be provided with the plurality of original equipment manufacturer's openings 152 as noted above.

While pre-located, original openings 126, 152, which may or may not be associated with anchor devices, are noted as being associated the B, C and/or D pillars 296, 298, 292, 294, 286, 288, other locations are possible. By way of example only, it is common that the vehicle manufacturer will include openings on ribs or other robust supports for the side walls 276, 278, the floor 280 the wheel well or other features.

In order to locate and install the organizational accessories 300, a rear street side plate 302 may be provided. The plate 302 may be unitary, one-piece and integrally formed, or it may be comprised of one or more pieces.

The plate 302 may have planar upper and lower surfaces 304, 306 where the two surfaces 304, 306 may define a constant thickness between them. Thus, except as noted below, the plate 302 may exist in a single plane. The plate 302 may have an outboard edge 308 (e.g., streetside) and an inboard edge 310 (opposite the outboard edge) further defining the thickness. The inboard and outboard edges 308, 310 may be substantially linear and continuous from a rear edge 312 to a front edge 314. The plate 302 may terminate at each of the rear and front edges 312, 314, which may be linear and parallel one another. Thus, in this embodiment, the plate 302 may be substantially rectangular in shape.

The plate 302 may have one or more anchor flanges 316, 318 connected thereto. In one embodiment, the anchor flanges 316, 318 may be unitary, integrally formed and one-piece with the plate 302. In other embodiments, one or more of the anchor flanges 316, 318 may be initially separate from, but later connected or attached to the plate 302. It may be preferred that the anchor flanges 316, 318 have the same thickness as the rest of the plate 302. The flanges 316, 318 may have inner and outer surfaces 320, 322 that are substantially parallel one another.

The anchor flanges 316, 318 are preferably positioned on the plate 302 so that they align with the pre-located, original openings 126, 152. By way of example, a first anchor flange 316 may be located on the rear edge 312, such as a rear, outboard edge, to align with a pre-located, original opening 126 in the street side D-pillar 288. Continuing the example, a second anchor flange 318 may be located on the outboard edge 308, including along a forward front edge, of the plate 302 to align with a pre-located, original opening 324 in the side wall 278. In some embodiments, the pre-located, original openings 126, 324 may be co-planar with one another.

In one embodiment, the anchor flanges 316, 318 may be such as tabs that extend from the plate 302 at an angle. The extension angle may vary by location to match the angled surface in which the pre-located, original openings 126, 324 are located. In the present example, the anchor flanges 316, 318 may extend approximately transverse to the primary direction of the plate 302, which may be parallel the longitudinal axis 326 of the vehicle 274 but other angles are permissible. Each anchor flange 318, 318 may have an aperture 328 extending therethrough. Fasteners 330 may be located through the first and second anchor flange apertures 328 into the pre-located, original openings 126, 324 to secure and locate the plate 302. In some embodiments, no other structure is used to secure the plate 302 to the floor 280, or any floor structure. Thus, the floor 280 and/or the floor structure is not moved, disturbed, drilled or otherwise compromised from its original installation position and/or condition.

The rear street side plate 302 may be located directly over the floor 280. In some embodiments, the lower surface 306 of the plate 302 may be in direct face-to-face contact with an upper surface 332 of the floor 280 with no intervening structures or space. The floor 280 may be entirely planar, or it may have structures, such as ribs 324. In the case where ribs 324 are used, the lower surface 306 of the plate 302 may be in direct, face-to-face contact with an upper surface 336 of the ribs 334. Thus, the plate 302 may be substantially parallel the floor 280, on the upper surface 336 of the ribs 334. The other plates described in this embodiment, except where noted otherwise, may be in the same arrangement with the floor 280.

With continued reference to FIGS. 5 and 7, one embodiment of a middle street side plate 338 may be seen. The middle street side plate 338 may be substantially the same as the rear street side plate 302, except as noted below. A first anchor flange 340 on the middle street side plate 338, such as on a rear outboard edge 342, may be secured to the vehicle side wall 278 and a second anchor flange 344 on the middle street side plate 338, such as on a forward outboard edge 346, may be secured to the C-pillar 294, or a reinforcement associated with the C-pillar 294 and the side wall 278 in substantially the same manner as described above for the rear street side plate 302. The plate 302 may be generally rectangular in shape.

A gap 350 separates the rear street side plate 302 and the middle street side plate 338. Typically, the wheel well 348 is located in the gap between the two plates 302, 338. A gap 352 also separates the middle street side plate 338 and a front street side plate 354.

The front street side plate 354 may have substantially planar upper and lower surfaces 356, 358 separated by a constant thickness. Thus, except as noted below, the plate 354 may exist in a single plane. The upper surface 356 may be parallel and co-planar with the upper surfaces of the rear street side plate 302 and the middle street side plate 338. In some embodiments, the plate 354 may be in direct contact with the floor 280 with no intervening structures, as noted above. The plate 354 may be unitary, one-piece and integrally formed, or it may be comprised of one or more pieces.

The plate 354 may have an inboard (rs. curbside) 360 and outboard (e.g., streetside) 362 edge further defining the thickness. The edges 360, 362 may be linear and continuous from a rear edge 364 to a front edge 366 of the plate 354, thus the edges 360, 362 may be parallel one another. The plate 354 terminates at the edges 360, 362, 364, 366 to define a generally rectangular shaped plate 354. The plate 354 may have the same, or substantially the same, width as the rear, and middle street side plates 302, 338. The outboard edge 362 may directly abut the street side wall 278 or there may be a gap between them.

The front street side plate 354 may have an anchor flange 368 on the front edge 366 of the plate 354. The anchor flange 368 may be as described above or it may have a different size and shape. In one embodiment, best seen in FIG. 5, the front edge 366 anchor flange 368 may extend transverse the primary direction (aligned with the longitudinal axis 326) of the plate 354; further, the front edge anchor flange 368 may extend a quarter to a half of the width of the front edge 366 of the plate 354 to match a portion of the B-pillar 298. Fasteners 330 may be located into the anchor flange aperture 370 and into the street side B-pillar 298 of the vehicle 274 to secure and locate the front street side plate 354 in place, as noted above. In one embodiment, the fasteners 330 may be located in the pre-loaded, original opening 152 in the B-pillar 298 so no additional apertures are needed.

In addition, as shown in FIG. 5, the front street side plate 354 may have an anchor flange 372 on the outboard edge 362 near the rear edge 364. The anchor flange 372 may be as described above for the rear and middle street side plates 302, 338. The anchor flange 372 may receive a fastener 330 that extends into a pre-loaded, original opening 324 in the side wall 278 to secure the plate 354 thereto, in the same or similar fashion as noted above.

Looking now at FIGS. 6 and 7, one embodiment of a rear curb side plate 374 may be seen located directly over the floor 280 in the same fashion noted above. A gap between the rear curb side plate and the rear street side plate where no additional related plates are located may exist. The two plates 302, 374 may be located substantially directly across from one another.

As described above, the plate 374 may be in direct contact with the floor 280 with no intervening structures. The plate 374 may be unitary, one-piece and integrally formed, or it may be comprised of one or more pieces.

The plate 374 may have an upper and a lower surface 376, 378 where the two surfaces define a constant thickness between them. The plate 374 may have an inboard and outboard edge 380, 382 further defining the thickness. The inboard and outboard edges 380, 382 may be linear and continuous from a rear edge to a front edge 384, 386. The plate 374 terminates at the edges 380, 382, 384, 386.

The plate 374 may have one or more anchor flanges 388, 390 connected thereto. In one embodiment, the anchor flanges 388, 390 may be unitary, integrally formed and one-piece with the plate 374. In other embodiments, one or more of the anchor flanges 388, 390 may be separately connected or attached to the plate 374. It may be preferred that the anchor flanges 388, 390 have the same thickness as the rest of the plate 374. Each flange 388, 390 may be formed from two opposite surfaces that are parallel one another.

The anchor flanges 388, 390 are preferably in the D-pillar 286 and the side wall 276 positioned on the plate 374 so that they align with the pre-located, original openings 126, 324. By way of example, a first anchor flange 388 may be located on a rear portion of the outboard edge 382 to align with a pre-located, original opening 126 in the curb side D-pillar 286. In some embodiments, a pre-located, original opening 126 may be left by a grab bar which has been removed from the D-pillar 286. The first anchor flange 388 may extend substantially transverse the primary direction (which may be parallel the longitudinal axis 326 of the vehicle 274) of the plate 374 and the first anchor flange 388 may have a height greater than the other anchor flanges 390.

Continuing the example, a second anchor flange 390 may be located on the outboard edge 382 of the plate 374, such as the near the front edge 386, to align with a pre-located, original opening 324 in the side wall 276 or a reinforcement thereof.

In one embodiment, the second anchor flange 390 may be such as a tab that extends from the plate 374 at an angle. The extension angle may vary by location to match the angled surface in which the original anchor device openings 324 are located. For example, the second anchor flange 390 on the outboard edge 382 of the plate 374 may extend from the plate 374 at an acute angle. In some cases, another angle may be needed so that an anchor flange 390 has a complementary angle to a pillar or other structure.

Fasteners 330 may be located through apertures 370 in the first and second anchor flanges 388, 390 and into the pre-located, original openings 126, 324 to secure and locate the plate 374. In some embodiments, the apertures for the grab bar may be aligned with the apertures 370 in the anchor flanges 388, 390. Thus, fasteners 330 may extend through both the grab bar and the anchor flanges 388, 390 to secure them both to the same pre-located, original openings 126.

With continued reference to FIGS. 6 and 7, one embodiment of a middle curb side plate 392 may be seen located directly over the floor 280 in the same fashion noted above. A gap between the middle curb side plate 392 and the middle street side plate 338 where no additional related plates are located may exist. The two plates 338, 392 may be located substantially directly across from one another.

In some embodiments, the plate 392 may be in direct contact with the floor 280 with no intervening structures in the same fashion noted above. The plate 392 may be unitary, one-piece and integrally formed, or it may be comprised of one or more pieces.

The plate 392 may have an upper and a lower surface 394, 396 where the two surfaces 394, 396 define a constant thickness between them. The plate 392 may have an inboard and outboard edge 398, 400 further defining the thickness. The inboard and outboard edges 398, 400 may be linear and continuous from a rear edge to a front edge 402, 404, except as noted. The plate 392 terminates at the edges 398, 400, 402, 404 to provide a generally rectangular shape.

The plate 392 may have one or more anchor flanges 406, 408 connected thereto. In one embodiment, the anchor flanges 406, 408 may be unitary, integrally formed and one-piece with the plate. In other embodiments, one or more of the anchor flanges 406, 408 may be separately connected or attached to the plate 392.

The anchor flanges 406, 408 are preferably positioned on the plate 392 so that they align with the pre-located, original openings 152, 324. By way of example, a first anchor flange 406 may be located on a rear portion of the outboard edge 400 to align with a pre-located, original opening 324 in the side wall 276 or a reinforcing structure thereof. The first anchor flange 406 may extend substantially transverse the primary direction of the plate 392, which may be parallel the longitudinal axis 326 of the vehicle 274.

Continuing the example, a second anchor flange 408 may be located on the outboard edge 400 of the plate 392, such as near the front edge 404, to align with a pre-located, original opening 152 in the B-pillar 296 or a reinforcement thereof.

In one embodiment, the second anchor flange 408 may be such as a tab that extends from the plate 392 at an angle. The extension angle may vary by location to match the angled surface in which the original anchor device openings 152 are located. For example, the second anchor flange 408 on the outboard edge 400 of the plate 392 may extend from the plate 392 at an acute angle. In some cases, other angles may be needed so that the anchor flange 408 has a complementary angle to the pillar 296 or other structure.

Fasteners 330 may be located through apertures 410 in the first and second anchor flanges 406, 408 and into the pre-located, original openings 152, 324 to secure and locate the plate 392, as noted above. Except as mentioned otherwise, the plate 392 may exist in a single plane. The upper surface 394 of the plate 392 may be co-planar with the upper surface 376 of the rear curb side plate 374.

Turning now to FIG. 8, one embodiment of organizational applications 300 is depicted located on the plates 302, 338, 354, 374, 392. The organizational applications 412 in the depicted embodiment are shelving units, but other applications may be used instead, or in combination with the shelving units. Further, while a certain number of shelving units are depicted, fewer unit, or units of different sizes, shapes and designs may be used.

The organizational applications 412 may have floor support portions 414 that directly contact the plates 302, 338, 354, 374, 392. The portions 414 may be such as feet of the shelving units that rest directly on the upper surfaces 304, 356, 376, 394 of the plates 302, 338, 354, 374, 392. Mechanical fasteners may be located through the feet and into the plates 302, 338, 354, 374, 392 to secure the shelving units in place. The present device ensures that the fasteners do not interfere with the floor 280, or anything below the floor 280.

The plates 302, 338, 354, 374, 392 may be all constructed of a material that provides a robust and secure base and securing structure to the vehicle 274. In one embodiment, the plates 302, 338, 354, 374, 392 may be constructed of metal, such as steel and/or aluminum alloys. Other materials such as composite materials, fiberglass, polymers and/or wood may also be used together or in combination with one another.

Third Embodiment

Turning now to FIGS. 9-12 another embodiment of a mounting solution 416 is depicted. The vehicle 418 and the mounting solution 416 depicted in FIGS. 9-12 may be the same, or similar, to that described and depicted above perhaps with the exceptions noted below. Thus, the same reference numbers may be used for the same or similar features.

In order to locate and install certain organizational accessories (not shown), a rear street side plate 420 may be located directly over the floor 422 in the same fashion noted above, as best seen in FIGS. 9 and 10. In some embodiments, the plate 420 may be in direct contact with the floor 422 with no intervening structures as noted above. The plate 420 may be unitary, one-piece and integrally formed, or it may be comprised of one or more pieces.

The plate 420 may have planar upper and lower surfaces 424, 426 where the two surfaces 424, 426 define a constant thickness between them. Thus, except as noted below, the plate 420 may exist in a single plane. The plate 420 may have an outboard edge (e.g., streetside) 428 and an inboard edge (opposite the outboard edge) 430 further defining the thickness. The inboard edge 430 may be linear and continuous from a rear edge 432 to a front edge 434. The outboard edge 428 may be adjacent or directly abut a side wall 436. The plate 420 may terminate at each of the edges 428, 430, 432, 434 to define a generally rectangular shape.

The plate 420 may have one or more anchor flanges 438 connected thereto. In one embodiment, the anchor flanges 438 may be unitary, integrally formed and one-piece with the plate 420. In other embodiments, one or more of the anchor flanges 438 may be separately connected or attached to the plate 420. It may be preferred that the anchor flanges 438 have the same thickness as the rest of the plate 420. The flanges 438 may have upper and lower surfaces 440, 442 that are substantially parallel one another.

The anchor flanges 438 are preferably positioned on the plate 420 so that they align with the pre-located, original openings 126. By way of example, a first anchor flange 438 may be located on the rear edge 432 to align with a pre-located, original opening 126 in the street side D-pillar 116. The front edge 434 may be without any anchor flanges thus leaving the first anchor flange 438 as the sole anchor flange 438 on the plate 420. The front edge 434 may terminate at or adjacent a wheel well 444 on the street side wall 436 of the vehicle 418.

In one embodiment, the first anchor flange 438 may be such as a tab extending from the plate 420 at an angle. The extension angle may vary by location to match the angled surface in which the pre-located, original opening 126 is located. For example, the first anchor flange 438 on the rear edge 432 of the plate 420 may extend approximately transverse to the primary direction of the plate 420, which may be parallel a longitudinal axis 446 of the vehicle 418. Each anchor flange 438 may have at least one aperture 448 that aligns with the pre-located, original opening 126. Fasteners 450 may be located through the first anchor flange aperture 448 into the pre-located, original opening 126 to secure and locate the plate 420. In some embodiments, no other structure is used to secure the plate 420 to the floor 442, or any floor structure. Thus, the floor 442 and/or the floor structure is not moved, disturbed, drilled or otherwise compromised from its original installation position and/or condition.

Figure 9:
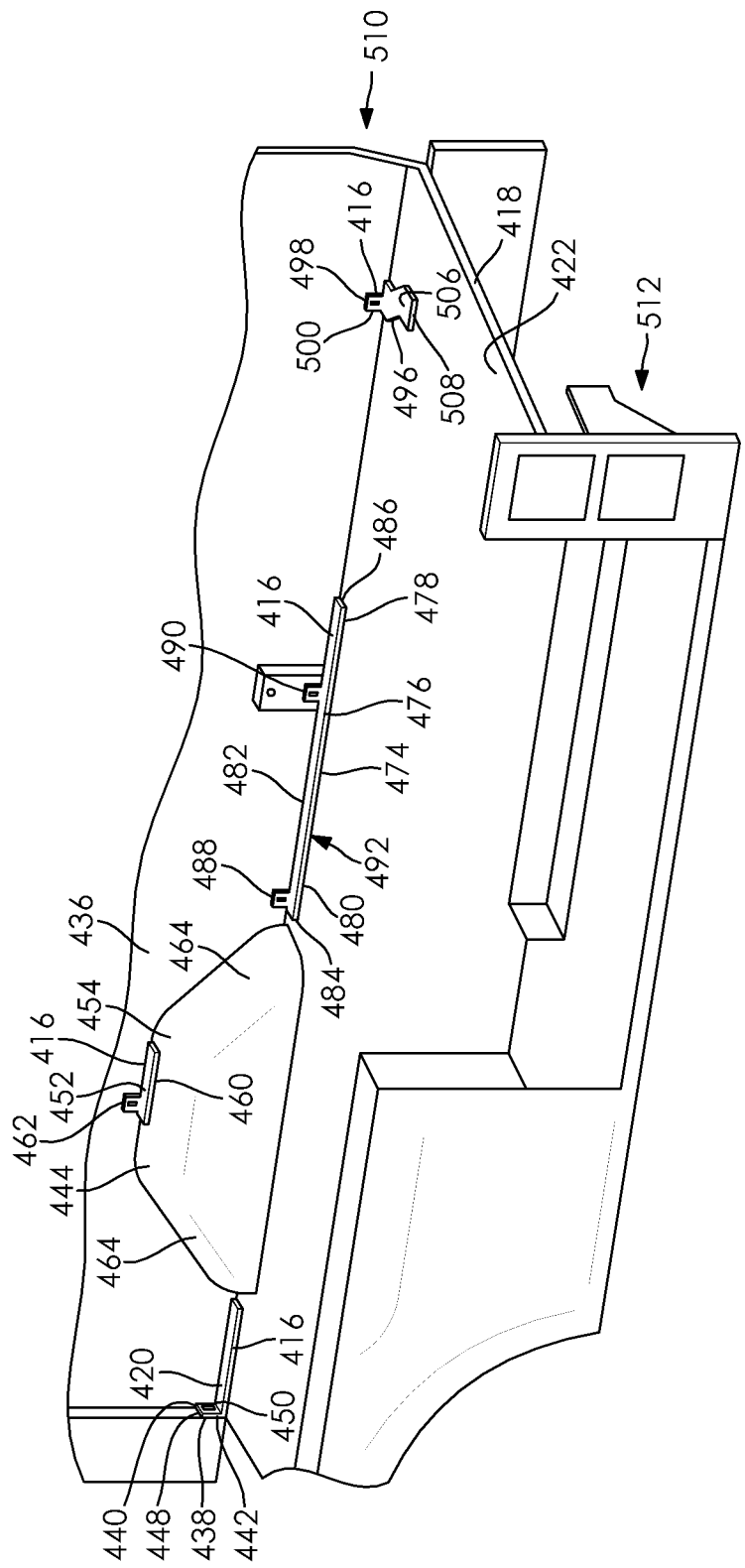
FIG. 9 is an upper, side perspective view of one embodiment of a cargo-type vehicle with another embodiment of a mounting solution.
Figure 10:
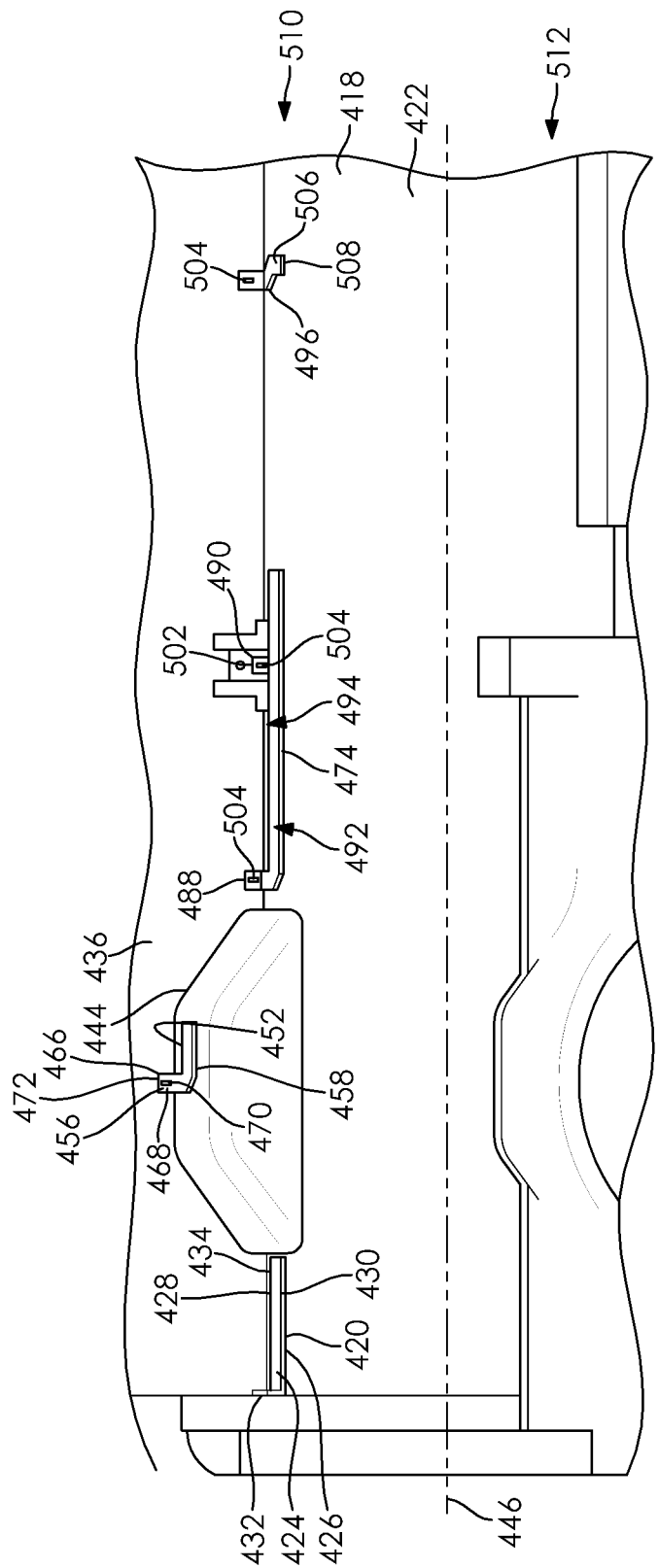
FIG. 10 is another view of the mounting solution from FIG. 9.

With continued reference to FIGS. 9 and 10, a wheel well plate 452 is depicted on an upper surface 454 of the wheel well 444. The plate 452 may have an upper surface 456 and a lower surface 458 defining a constant thickness between them, where the lower surface 458 may be in direct contact with no intervening structures with the upper surface 454 of the wheel well 444. The plate 452 may define a general L-shape with a first leg 460 generally aligned with the longitudinal axis 446 of the vehicle 418 and a second leg 462 angled therefrom, such as transversely angled. The plate 452 may only reside on the upper, substantially planar surface 454 of the wheel well 444 and not extend to the angled side surfaces 464 of the wheel well 444.

An anchor flange 466 may extend from the second leg 462. The anchor flange 466 may be located at an angle, such as a transverse angle to the second leg 462. The anchor flange 466 may have a fastener aperture 468 extending therethrough. A fastener 470 may be located through the aperture 468 in the flange 466 and into a pre-located, original opening 475 for the wheel well, the side wall or a side wall rib.

An intermediate street side plate 474 may be located forward of the wheel well 444 in direct contact, such as noted above, with the floor 422 of the vehicle 418. The intermediate street side plate 474 may have an upper and a lower surface 476, 478 separated by a constant thickness. In some embodiments, the plate 474 may be in direct contact, as noted above, with the floor 422 with no intervening structures. The plate 474 may be unitary, one-piece and integrally formed, or it may be comprised of one or more pieces.

The plate 474 may have an inboard and outboard edge 480, 482 further defining the plate 474. The edges 480, 482 may be substantially linear and continuous from a rear edge 484 to a front edge 486 of the plate 474, thus the edges 480, 482 may be parallel one another, except as noted below. The outboard edge 482 may be adjacent or directly abut the side wall 436.

The intermediate street side plate 474 may have a first anchor flange 488 on a rear portion of the plate 474, such as on the outboard side 482 adjacent the rear edge 484. The anchor flange 488 may be as described above or it may have a different size and shape. In one embodiment, the first anchor flange 488 may extend transverse the primary direction of the plate 474.

The intermediate street side plate 474 may also have an anchor flange 490 on an intermediate portion or forward portion of the plate 474, such as along the outboard edge 482. This anchor flange 490 may be as described above or it may have a different size and shape. In one embodiment, the intermediate anchor flange 490 may extend transverse the primary direction of the plate 474, which may be parallel the longitudinal axis 446 of the vehicle 418.

An intermediate portion 492 of the plate 474 from which the flange 490 extends may have a recessed or cut out portion 494 having a complementary shape to the C-pillar 144. This permits the plate 474 to be located adjacent the pillar 144, including in direct contact with the pillar 144, thus saving room for the organizational application mounted thereon.

A forward street side plate 496 may be located forward from the intermediate plate 474. In some embodiments, a gap may separate the two plates 496, 474, where no additional plates are located.

The forward street side plate 496 may have an S-shape but other shapes are permissible; the plate 496 may also have a much smaller longitudinal length compared with plates 420, 474. On an outboard side of the plate 496, an anchor flange 498 may be located thereon. The anchor flange 498 may be as described above such as the anchor flange 466 on the wheel well plate 452. An aperture 500 in the anchor flange 498 may aligned with a pre-located, original opening 502 in a side wall rib 134 for the vehicle 418. As noted above, a fastener 504 may be located through the anchor flange aperture 500 and the side wall rib opening 502 to secure the plate 496 to the vehicle 418. A gap may exist between the forward street side plate 496 and the B-pillar 140 for the vehicle 418.

The anchor flange 498 may be one leg of the S for the plate 496. The other two legs of the S may be coplanar with one another. These two base legs may have upper and lower surfaces 506, 508, which may define a constant thickness between them. The lower surface 508 may be located in direct facing contact with the floor 422, as noted above for the other plates.

The upper surfaces 506, 476, 424 of the forward, intermediate and rear street side plates 496, 474, 420 may be coplanar with one another. Similarly, the lower surfaces 508, 478, 426 of the plates 496, 474, 420 may be coplanar with one another. Further, the pre-located, original openings 126, 152, 502 on a street side 510 of the vehicle 418 may all be coplanar with one another, and located above the upper surfaces 506, 476, 424 of the plates 496, 474, 420.

Turning now to FIGS. 11 and 12, one embodiment of mounting solutions 416 on a curbside 512 of the vehicle 418 is depicted. A rear curb side plate 514 may be provided. In some embodiments, the plate 514 may be in direct contact with the floor 422 with no intervening structures in the same fashion noted above. The plate 514 may be unitary, one-piece and integrally formed, or it may be comprised of one or more pieces.

The plate 514 may have an upper and a lower surface 516, 518 where the two surfaces 516, 518 may define a constant thickness between them. The plate 514 may have an inboard and outboard edge 520, 522 further defining the thickness. The inboard edge 520 may be generally linear and continuous from a rear edge 524 to a front edge 526. The plate 514 terminates at the edges 520, 522, 524, 526 to define a generally rectangular shape.

The plate 514 may have one or more anchor flanges 528 connected thereto. In one embodiment, the anchor flanges 528 may be unitary, integrally formed and one-piece with the plate 514. In other embodiments, one or more of the anchor flanges 528 may be separately connected or attached to the plate.

Any anchor flanges 528 are preferably positioned on the plate 514 so that apertures 530 in the flange 528 aligns with pre-located, original openings 126. By way of example, a first anchor flange 528 may be located on a rear outboard edge 522 to align with a pre-located, original opening 126 in the curb side D-pillar 114.

In some embodiments, openings 126 in the D-pillar 114 for a grab bar may be aligned with the aperture 530 in the anchor flange 528. Thus, fasteners 532 may extend through both the grab bar and the anchor flange 528 to secure them both to the same pre-located original opening 126 in the D-pillar 114.

The front edge 526 of the plate 514 may be without any anchor flanges thus leaving the first anchor flange 528 as the sole anchor flange on the plate 514. The front edge 526 may terminate at or adjacent a wheel well 534 on the street side 510 of the vehicle 418. In some embodiments, the front edge 526 may have an outboard foot 536 extending therefrom to provide additional surface area for an organizational application to reside thereon.

In one embodiment, the first anchor flange 528 may be such as a tab extending from the plate 514 at an angle. The extension angle may vary by location to match the angled surface in which the pre-located, original openings 126 are located. For example, the anchor flange 528 on the rear outboard edge 522 of the plate 514 may extend approximately transverse to the primary direction of the plate 514, which may be parallel with the longitudinal axis 446 of the vehicle 418. Fasteners 538 may be located through the anchor flange apertures 530 into the pre-located, original openings 126 to secure and locate the plate.

The plate 514 may at least partially enclose a portion of the floor 422 between the plate 514 and the side wall 512 of the vehicle 418. This area may be left open and not covered by the plate 514. In some embodiments, equipment, such as electronic equipment for the vehicle 418, may be located on the floor 422 in this location.

With continued reference to FIGS. 11 and 12, one embodiment of a curbside wheel well plate 540 is depicted on an upper surface 542 of a wheel well 544. The location, shape, features and function of the curbside wheel well plate 540 may be the same or substantially the same as the wheel well plate 452 on the street side wheel well 444.

An intermediate curb side plate 546 may be located forward of the wheel well 534 on the floor 422 of the vehicle 418. The intermediate curb side plate 546 may have an upper and a lower surface 548, 550 separated by a constant thickness. In some embodiments, the plate 546 may be in direct contact with the floor 422 with no intervening structures, as noted above. The plate 546 may be unitary, one-piece and integrally formed, or it may be comprised of one or more pieces.

The plate 546 may have an inboard and an outboard edge 552, 554 further defining the plate 546. The outboard edge 552 may be adjacent or directly abut the side wall 556. The edges 552, 554 may be substantially linear and continuous from a rear edge 558 to a front edge 560 of the plate 546, thus the edges 558, 560 may be parallel one another, except as noted below.

The intermediate curb side plate 546 may have an anchor flange 562 on a rear portion of the outboard edge 554. The anchor flange 562 may be as described above or it may have a different size and shape. In one embodiment, the rear anchor flange 562 may extend generally transverse the primary direction of the plate 546, such as along the longitudinal axis 446 of the vehicle 418.

The intermediate curb side plate 546 may also have an anchor flange 564 on a forward portion of the outboard edge 554. The anchor flange 564 may be as described above or it may have a different size and shape. In one embodiment, the anchor flange 564 may extend transverse the primary direction of the plate 546.

The forward and rear anchor flanges 562, 564 may be differently sized and shaped from one another and extend from the plate 546 in different proportions to match with the pre-located, original openings in the vehicle 418. For example, the forward anchor flange 562 may be shaped, sized and positioned to match with an opening 152 in the C-pillar 142 while the rear anchor flange 564 may be sized, shaped and positioned to match with an existing opening 566 in the side wall 556 or a rib of the vehicle 418. As the C-pillar 142 extends into the cargo area 106 of the vehicle 418 a greater extent than the side wall 556, the forward anchor flange 564 may not need to outwardly extend from the plate 546 to the extent that the rear flange 562 extends in the outboard direction. The plate 546 may terminate at the forward anchor flange 564 and the rear anchor flange 562.

The upper 516, 548 and lower 518, 550 surfaces of the rear and intermediate curb side plates 514, 546, except for the wheel well plate 540, may be generally coplanar, respectively, in the vehicle 418. Thus, they may all have substantially the same thickness; the wheel well plate 540 may also be of the same thickness as the other plates 514, 546. It may also be preferred that none of the plates 514, 540, 546 touch one another. Instead, there may a gap between them spanned by the vehicle floor 422. Further, in this embodiment, the width of the plates 514, 540, 546 may be less than the width of the wheel well 544, thus the plates 514, 540, 546 only take up a small portion of the floor 422.

In some embodiments, the plates 420, 474, 514, 546, except the wheel well plates 452, 540, may be located in a single plane. The anchor flanges 438, 488, 490, 498, 528, 562, 564 for the plates 420, 474, 514, 546 may have the same thickness as their respective plate in some embodiments. Further, in certain embodiments, the anchor flanges 438, 488, 490, 498, 528, 562, 564 may have upper and lower surfaces that are each substantially parallel. It may be that in some cases, the apertures such as 448, 500, 530 in the anchor flanges 438, 488, 490, 498, 528, 562, 564 are coplanar with one another, and the anchor flange apertures such as 448, 500, 530 are also coplanar with the pre-located, original openings 126, 152, 474, 502 in the vehicle 418 so that fasteners can be located therethrough to secure the plates 420, 474, 514, 546 to the vehicle 418. In such a case, it may be that no other structures are required to secure the plates 420, 474, 514, 546 to the floor 422, or any floor structure. Thus, the floor 422 and/or floor structure is not moved, disturbed, drilled, or otherwise compromised from its original installation position or condition.

The plates 420, 474, 514, 546, except as noted above, may be located directly over the floor 422. In some embodiments, the lower surfaces 426, 478, 508, 518, 550 of the plates 420, 474, 514, 546 may be in direct face-to-face contact with an upper surface 424 of the floor 422 with no intervening structures or space. The floor 422 may be entirely planar, or it may have structures, such as ribs 568. In the case where ribs 568 are used, the lower surfaces 426, 478, 508, 518, 550 of the plates 420, 474, 514, 546 may be in direct, face-to-face contact with an upper surface 570 of the ribs 568. Thus, the plates 420, 474, 514, 546 may be substantially parallel the floor 422, on the upper surface 570 of the ribs 568.

Figure 13:
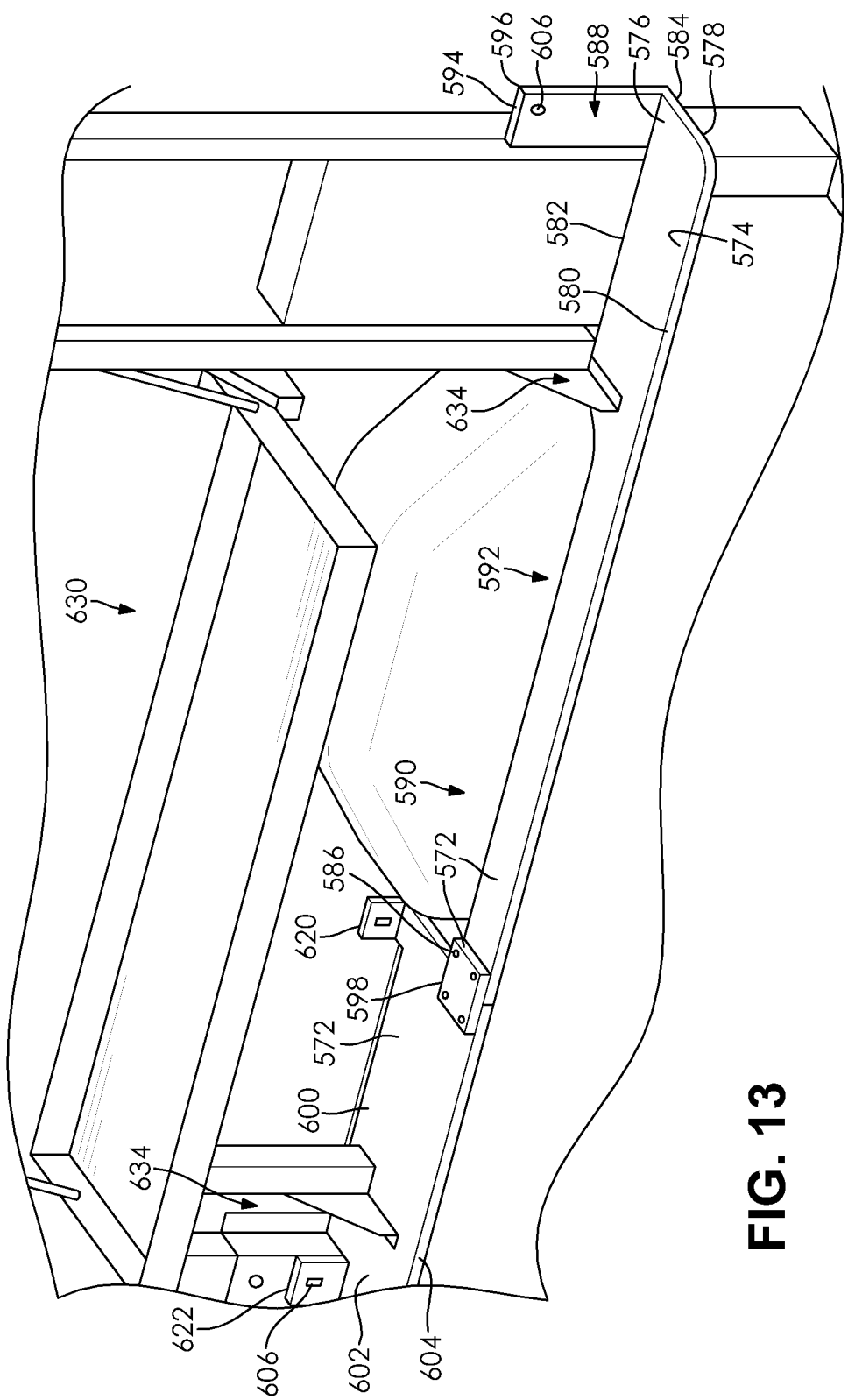
FIG. 13 is another embodiment of an upper, side perspective view of another mounting solution.
Figure 14:
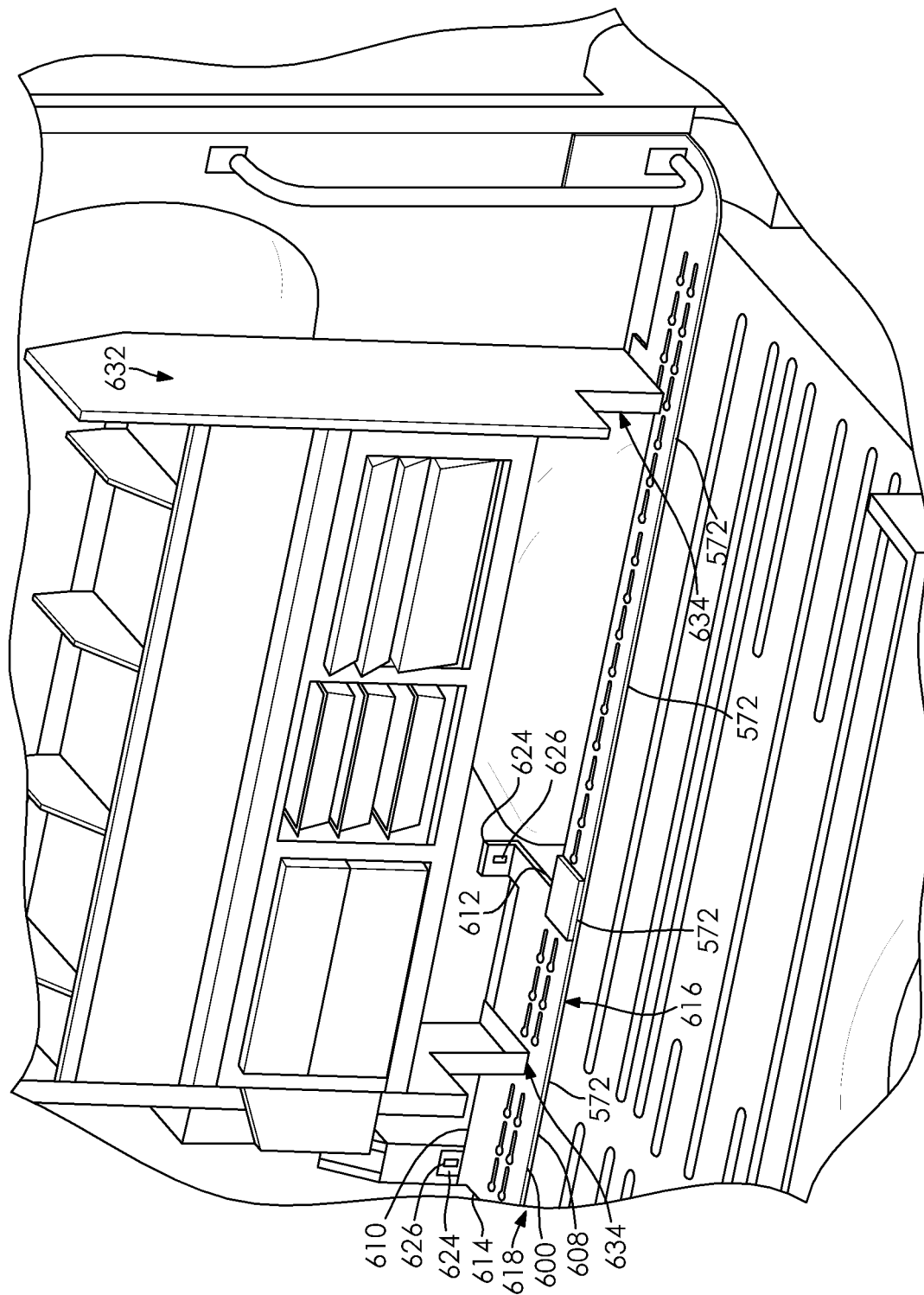
FIG. 14 depicts a variation of an organizational application that may be located on the mounting solution in FIG. 13.
Figure 15:
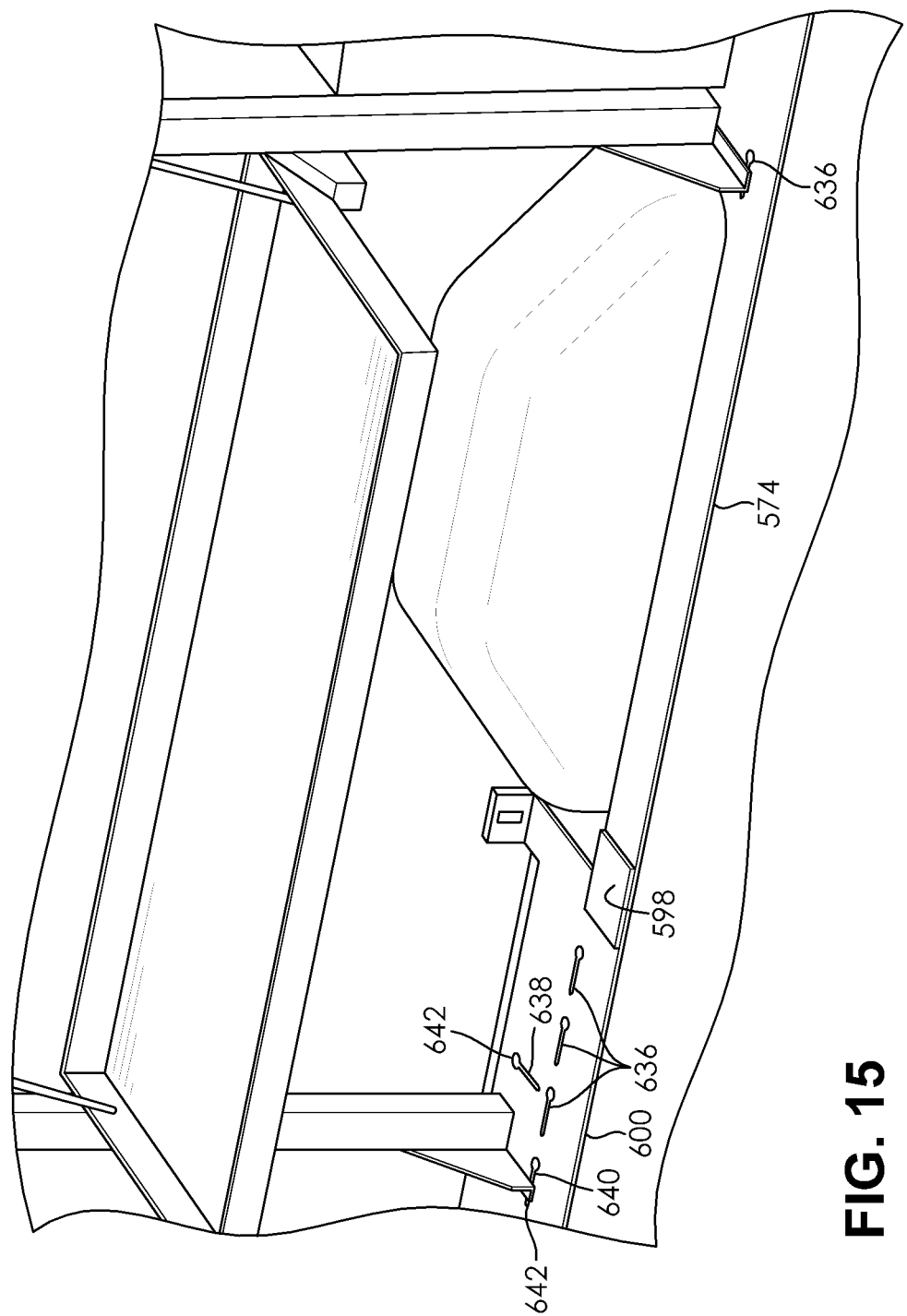
FIG. 15 depicts a mounting solution related to FIG. 14.

Turning now to FIGS. 13-15, various additional mounting solution 572 embodiments are depicted. The mounting solutions 572 in the embodiments may be mixed and matched with any of the solutions 110, 284, 416 mentioned above. Thus, the same reference numbers noted above may be used for the same or similar features. In FIGS. 13 and 14, one embodiment of a rear curb side plate 574 located directly over the floor 104, which may be installed as noted above, is provided. In some embodiments, the plate 574 may be in direct contact with the floor 104 with no intervening structures. The plate 574 may be unitary, one-piece and integrally formed, or it may be comprised of one or more pieces.

The plate 574 may have an upper and a lower surface 576, 578 where the two surfaces 576, 578 define a constant thickness between them. The plate 574 may have an inboard and an outboard edge 580, 582 further defining the thickness. The inboard edge 580 may be substantially linear and continuous from a rear edge 584 to a front edge 586. The plate 574 may terminate at the edges 580, 582, 584, 586. The outboard edge 582 may define a curvilinear path that may be complementary to the side wall as well 130 as a wheel well 244 for the curb side rear wheel (not shown), both of which the outboard edge may be adjacent to or directly abut. The outboard edge 582 may also have a recess to accommodate vehicle components, which, for an electric or electric-hybrid vehicle may be such as an inverter or the like.

In one embodiment, a rear portion 588 and a forward portion 590 of the outboard edge 582 may be substantially linear, while an intermediate portion 592 located between the portions 588, 590 may be curved, or recessed, to accommodate the wheel well 244. This may result in the plate 574 having a C-shaped outboard edge 582. In other cases, the outboard edge 582 may proceed substantially linearly from the rear portion 588 to the forward portion 590 along the wheel well 244.

The plate 574 may have one or more anchor flanges 594 connected thereto. In one embodiment, the anchor flanges 594 may be unitary, integrally formed and one-piece with the plate 574. In other embodiments, one or more of the anchor flanges 594 may be separately connected or attached to the plate 574.

The anchor flanges 594 are preferably positioned on the plate 574 so that apertures 596 in the flanges 594 align with the pre-located, original openings 126 in the vehicle 102. By way of example, a first anchor flange 594 may be located on the rear portion 588 of the outboard edge 582 to align with a pre-located, original opening 126 in the curb side D-pillar 114. In some embodiments, the pre-located, original opening 126 may be left by a grab bar which has been removed from the D-pillar 144. The first anchor flange 594 may extend substantially transverse the primary direction of the plate 594, which may be aligned with the vehicle longitudinal axis 188, and the first anchor flange 594 may have a height greater than the other anchor flange, on this plate 574 or others in this embodiment, to reach the pre-located, original opening 126.

In some embodiments, a transition plate 598 may be used to connect the rear curb side plate 574 and an intermediate curb side plate 600. The transition plate 598 may have an upper surface 602 and a lower surface 604 defining a constant thickness between them, where the lower surface 604 may be in direct contact with the upper surfaces 576, 602 of both plates 574, 600. Mechanical fasteners 606 may be located through the transition plate 598 into both side plates 574, 600 to secure them together. In most cases, the mechanical fasteners 606 will not extend into the vehicle floor 104 for the reason noted above. The transition plate 598 may extend only a portion of the width of the plates 574, 600 and may be only a fraction of the length of the plates 574, 600.

The intermediate curb side plate 600 may located directly over the floor 104 so that it is coplanar with the rear curb side plate 574. In some embodiments, the plate 600 may be in direct contact with the floor 104 with no intervening structures. The plate 600 may be unitary, one-piece and integrally formed, or it may be comprised of one or more pieces.

The plate 600 may have an inboard and outboard edge 608, 610 further defining the thickness. The inboard edge 608 may be substantially linear and continuous from a rear edge 612 to a front edge 614. The outboard edge 610 may be located adjacent the side wall 130, or directly abut it. The plate 600 may terminate at the edges 608, 610, 612, 614. The outboard edge 610 may define a path that complementary to the side wall 130, which may require the outboard edge 160 to extend in a curvilinear fashion or simply linearly.

In one embodiment, a rear portion 616 and a forward portion 618 of the outboard edge 610 may be substantially linear. The plate 600 may have one or more anchor flanges 620, 622 connected thereto. In one embodiment, the anchor flanges 620, 622 may be unitary, integrally formed and one-piece with the plate 600. In other embodiments, one or more of the anchor flanges 620, 622 may be separately connected or attached to the plate 600.

The anchor flanges 620, 622 are preferably positioned on the plate 600 so that apertures 624 in the flanges 620, 622 align with the pre-located, original openings 152, 626 in the vehicle 102, which may be in pillars, side walls and/or ribs.

By way of example, a first anchor flange 620 may be located on a rear portion 616 of the outboard edge 610 to align its aperture with a pre-located, original opening 626 in the vehicle side wall 130 or rib 134. The first anchor flange 620 may extend substantially transverse the primary direction of the plate 600.

Continuing the example, a second anchor flange 622 may be located on a forward portion 618 of the outboard edge 610 of the plate 600 to align its aperture 624 with a pre-located, original opening 152 on the curb side C-pillar 142, rib or side wall.

In one embodiment, the second anchor flange 622 may be such as a tab that extends from the plate 600 at an angle. The extension angle may vary by location to match the angled surface in which the pre-located, original opening 152 is located. For example, the second anchor flange 622 on the outboard edge 610 of the plate 600 may extend from the plate 600 at an acute angle. In some cases, an angle other than 90 degrees may be needed so that the anchor flange 622 has a complementary angle to the pillar 142 or other structure.

Fasteners 606 may be located through the first and second anchor flange apertures 624 into the per-located original openings 152 to secure and locate the plate 600.

FIG. 13 depicts one embodiment of an organization application 630 attached to the plates 574, 600, while FIG. 14 depicts another embodiment of an organizational application 632 attached to the plates 574, 600. While two embodiments of organizational applications 630, 632 are depicted in the figures, other organizational applications may be used that may have different sizes, shapes, locations, features and/or functions.

The organizational applications 630, 632 may have floor support portions 634 that directly contact the plates 574, 600. The portions 634 may be such as feet that rest directly on the upper surfaces 576, 602 of the plates 574, 600. Mechanical fasteners (not shown) may be located through the feet and into the plates 574, 600 to secure the applications 630, 632 in place. The present device ensures that the fasteners do not interfere with the floor 104, or anything below the floor 104.

The plates 574, 600 may be all constructed of a material that provides a robust and secure base and securing structure to the vehicle 102. In one embodiment, the plates 574, 600 may be constructed of metal, such as steel and/or aluminum alloys. Other materials such as composite materials, fiberglass, polymers and/or wood may also be used together or in combination with one another.

In some embodiments, the plates 574, 600 in this embodiment may be located in a single plane. The anchor flanges 594, 620, 622 for the plates 574, 600 may have the same thickness as the plates 574, 600 in some embodiments. In these embodiments, it may be that no other structures are required to secure the plates 574, 600 to the floor 104, or any floor structure. Thus, the floor 104 and/or floor structure is not moved, disturbed, drilled, or otherwise compromised from its original installation position or condition.

The plates, 574, 600 except as noted above, may be located directly over the floor 104. In some embodiments, the lower surfaces 578, 604 of the plates 574, 600 may be in direct face-to-face contact with the upper surface 194 of the floor 104 with no intervening structures or space. The floor 104 may be entirely planar, or it may have structures, such as ribs 196. In the case where ribs 196 are used, the lower surfaces 578, 604 of the plates 574, 600 may be in direct, face-to-face contact with the upper surface 198 of the ribs 196. Thus, the plates 574. 600 may be substantially parallel the floor 104, on the upper surface 198 of the ribs 196.

FIG. 15 depicts a variation of the plates 574, 600 from FIGS. 13 and 14. In this embodiment, the plates 574, 600 may be provided with slots 636, 638 extending from the upper surfaces 576, 602 to the lower surfaces 578, 604. The slots 636, 638 may be such as for fasteners so that different sizes, shapes and types of organizational applications 630 may be located on the plates 574, 600 and then aligned with the appropriate fastener slots 636, 638. The slots 636, 638 may be oriented in any direction and be of different shapes and sizes. In one embodiment, one set of slots 636 may be aligned with the primary direction of the plates 574, 600, such as along the longitudinal axis 188 of the vehicle 100, while another set of slots 638 may be transverse the primary direction of the plates 574, 600. Further, in some embodiments, the slots 636, 638 may have a body portion 640 of a first width and a head portion 642 connected to the body portion 640 of a second, wider width. In these embodiments, a fastener with a flat washer, or the like, may be located in the head portion 642 and the fastener and the washer may be slid to the body portion 640 where the narrower width retains the fastener therein. Using some or all of the features mentioned above, the plates 574, 600 may become universal to the various types of organizational applications e.g. 630, 632 that may be located and secured thereto. In any case, however, it may be preferred that the fasteners used in this application also do not disrupt the floor 104, as noted above.

Figure 16:
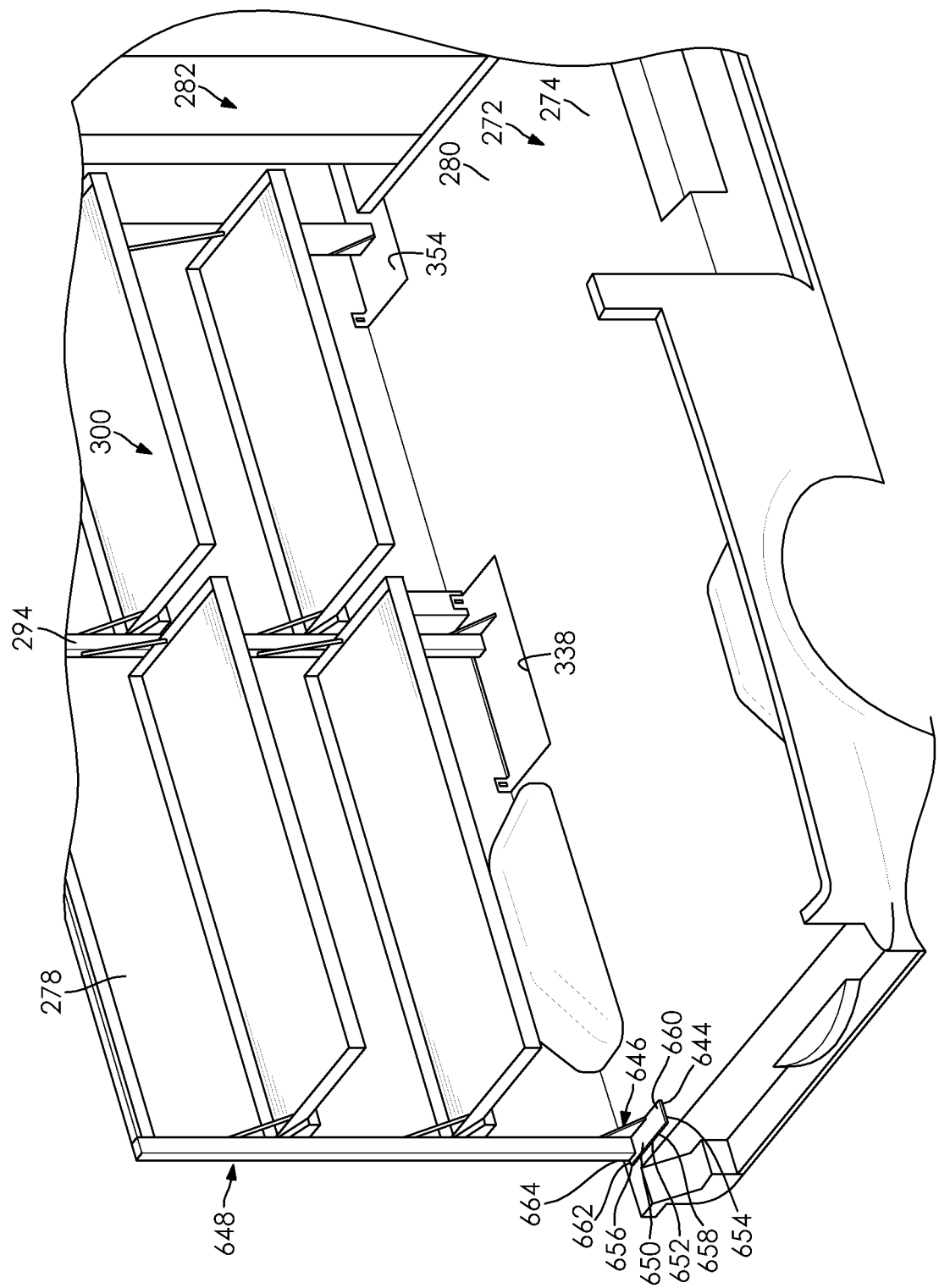
FIG. 16 depicts one embodiment of a variation on FIG. 5.

Turning now to FIGS. 16-19, various additional mounting solution embodiments are depicted. FIG. 16 may be a variation on FIG. 5 discussed above, thus like reference numbers for the same or similar features will be used. In one embodiment, the variation may be such as an alternative rear street side plate 644. In this example, the rear street side plate 644 may be only have a portion of the length of the previous rear street side plate 302. The rear street side plate 644 may have a width sufficient to receive the foot 646 of an organizational application 648 thereon. Thus, the plate 644 may be substantially rectangular in shape with its largest dimension extending toward the longitudinal axis 326 of the vehicle 274. The plate 644 may be located directly over the floor 280. In some embodiments, the plate 644 may be in direct contact with the floor 280 with no intervening structures. The plate 644 may be unitary, one-piece and integrally formed, or it may be comprised of one or more pieces.

The plate 644 may have an upper and a lower surface 650, 652 where the two surfaces 650, 652 define a constant thickness between them. The plate 644 may have an inboard and outboard edge 654, 656 further defining the thickness. The inboard edge 654 may be substantially linear and continuous from a rear edge 658 to a front edge 660. The outboard edge 656 may be located adjacent, or directly abut, the side wall 278. The plate 644 may terminate at the edges 654, 656, 658, 660.

The plate 644 may have one or more anchor flanges 662 connected thereto. In one embodiment, the anchor flanges 662 may be unitary, integrally formed and one-piece with the plate 644. In other embodiments, one or more of the anchor flanges 662 may be separately connected or attached to the plate 644.

The anchor flanges 662 are preferably positioned on the plate 644 so that apertures therein align with a pre-located original opening in the vehicle. By way of example, a first anchor flange 664 may be located on the outboard edge 656 so its aperture 664 aligns with the pre-located original opening 126 in the curb side D-pillar 286. In some embodiments, the pre-located original opening 126 may be left by a grab bar which has been removed from the D-pillar 286. The first anchor flange 664 may extend substantially transverse the primary direction of the plate 644.

In FIG. 16 open gaps of floor 280 may separate each of the plates 644, 338, 354 from one another, which nevertheless are coplanar with one another, as noted above. Organizational applications 648 may span over and between the plates 644, 338, 354 for connection therewith.

Figure 17:
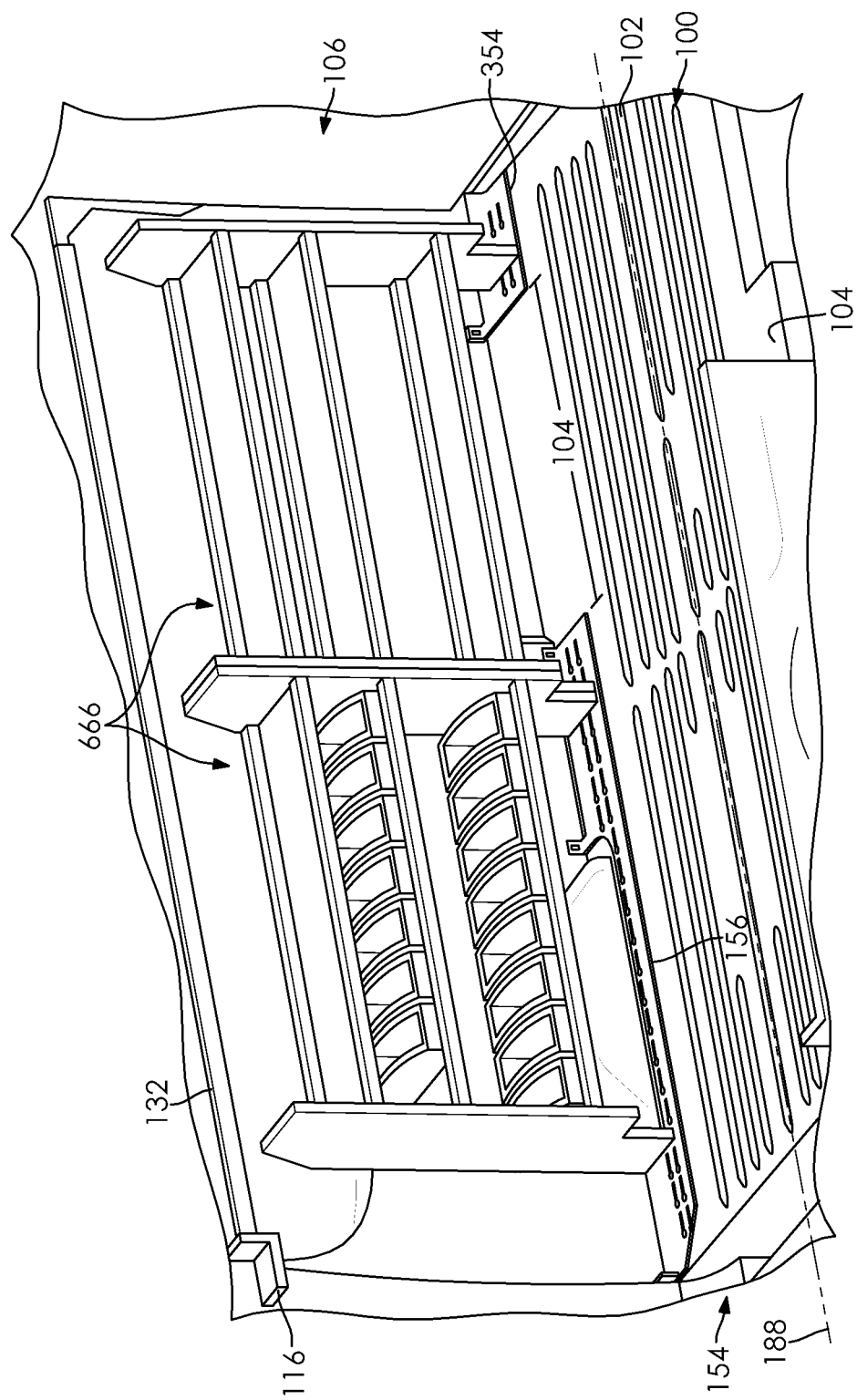
FIG. 17 depicts one embodiment of a variation of FIGS. 1 and 5.

FIG. 17 depicts an embodiment utilizing a combination of the rear street side plate 156 from FIG. 1 and the front street side plate 354 from FIG. 5. In this embodiment, a gap of floor 104 separates the rear street side plate 156 and the front street side plate 354, but the plates 156, 354 are coplanar with one another. In this embodiment as well, organizational applications 666 may span over and between the plates 156, 354 for connection therewith.

Figure 18:
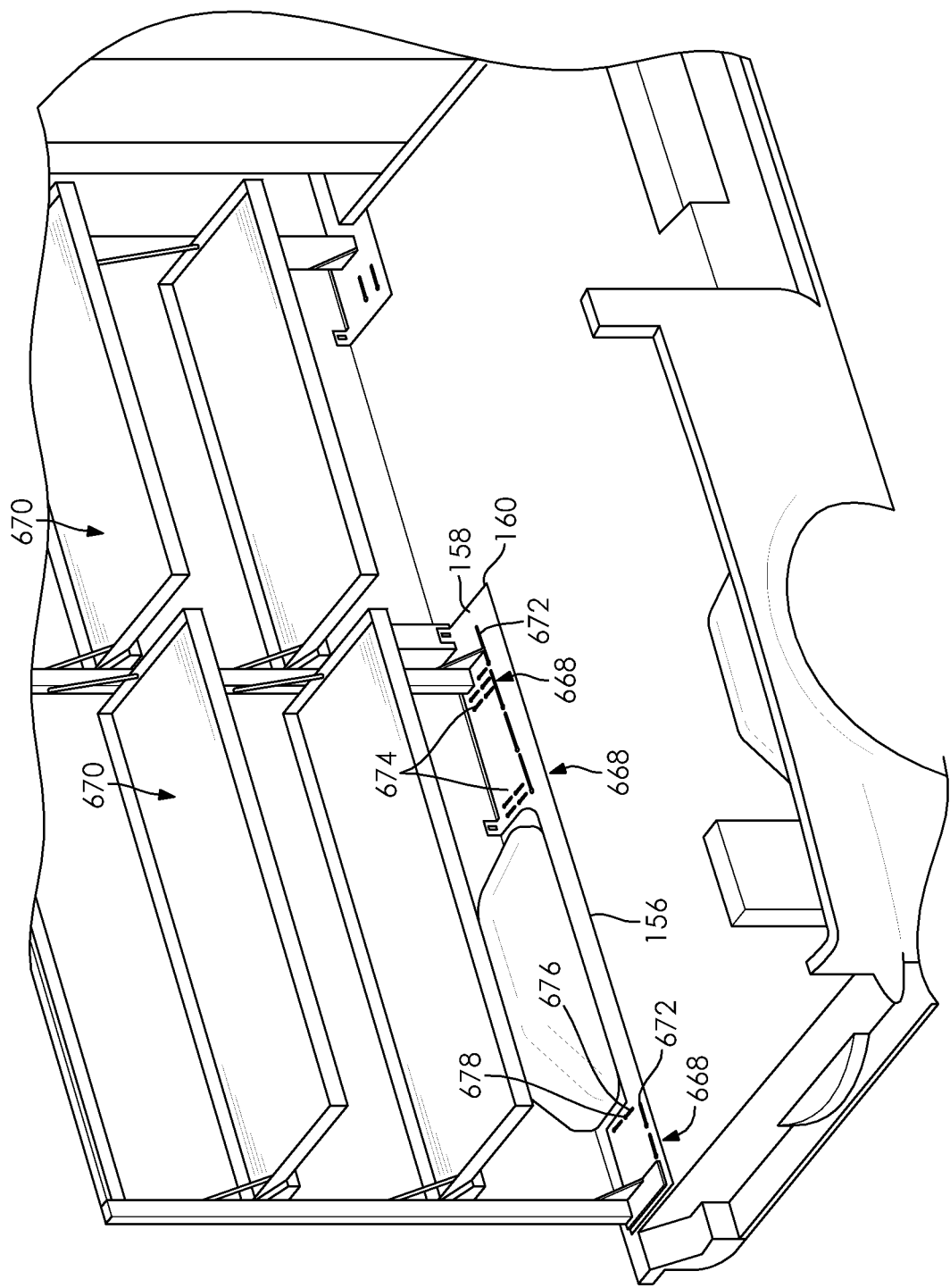
FIG. 18 depicts one embodiment of a variation on FIG. 17.
Figures 19, 20:
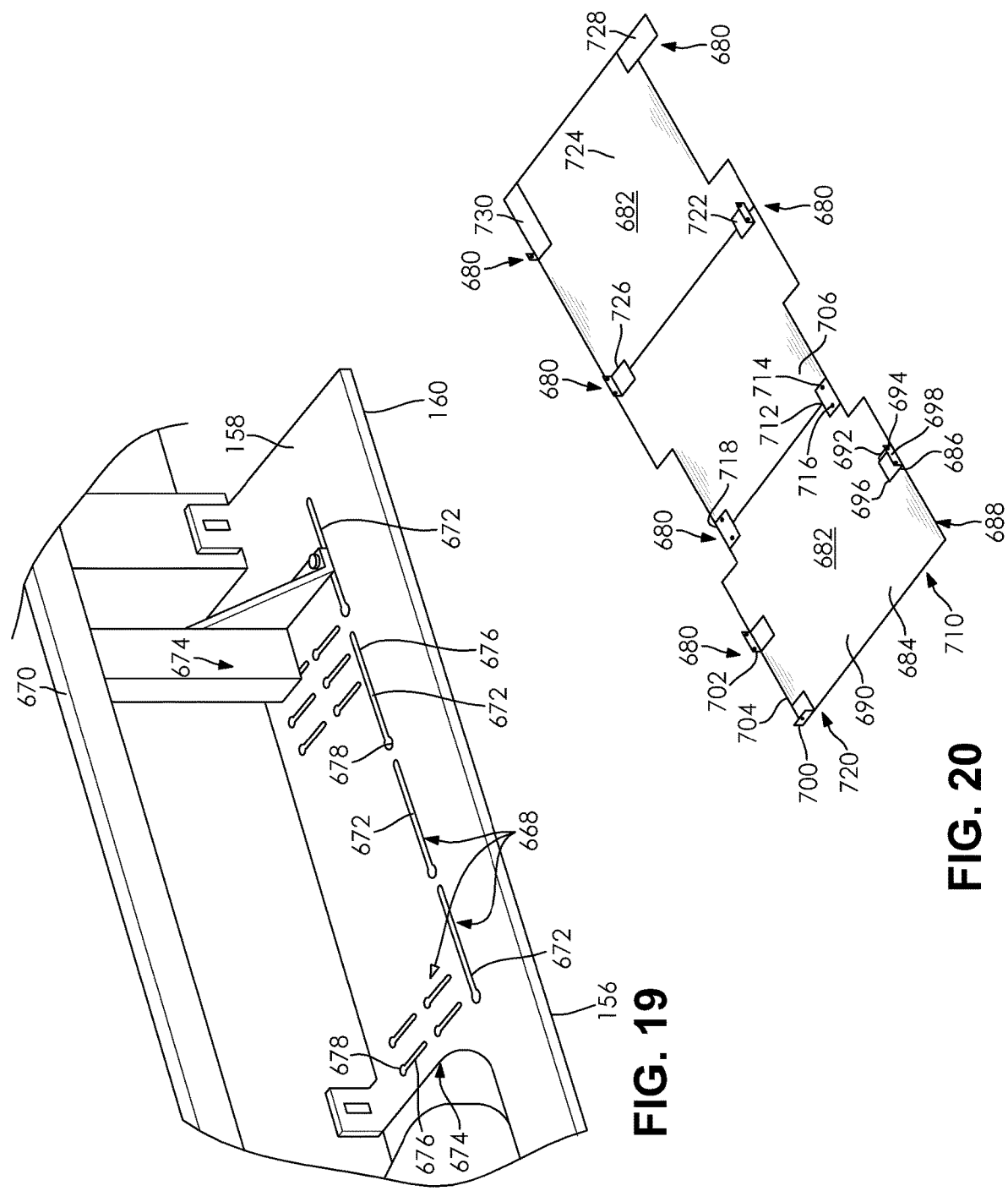
FIG. 19 depicts a detail of FIG. 18.
FIG. 20 is another embodiment of an upper, side perspective view of another mounting solution.

FIGS. 18 and 19 depict a variation with one embodiment of the rear street slide plate 156 from FIG. 1. In this embodiment, the plate 156 may be provided with slots 668 extending from the upper surface 158 to the lower surface 160 similar to the slots 668 depicted and described above in FIG. 15. Here also, the slots 668 may be such as for fasteners so that different sizes, shapes and types of organizational applications 670 may be located on the plate 156, as noted above, and then aligned with the appropriate fastener slots. The slots 668 may be oriented in any direction and be of different shapes and sizes. As shown, in one embodiment one set of slots 672 may be aligned with the primary direction of the plate 156, such as aligned with the longitudinal axis 188 of the vehicle 102, while another set of slots 674 may be transverse the primary direction of the plate 156. Further, in some embodiments, the slots 672, 674 may have a body portion 676 of a first width and a head portion 678 connected to the body portion 676 of a second, wider width. In these embodiments, a fastener with a flat washer or the like may be located in the head portion 678 and the fastener and the washer may be slid to the body portion 676 where the narrower width retains the fastener therein.

From at least the above, it can be appreciated that the various plates from the various embodiments described and depicted herein can be mixed and matched to form supports for the desired organizational applications.

Fourth Embodiment

Turning now to FIG. 20 another embodiment of a mounting solution 680 is depicted. In this embodiment, one or more panels 682 that may have at least a partially complementary size and/or shape of a vehicle floor are depicted. In FIG. 20 several panels 682 are depicted, but it may be that fewer panels 682 are used, or that the several panels 682 are made as a single panel 682.

The panels 682 may be constructed of any material including wood, metal or other man made materials, such as composites and/or polymers. In one embodiment, a backing material may be located at least partially under the panels 682. The backing material may function as insulation, cushioning and/or to assist in securing the panels 682 to the floor.

Plates may be located on a portion of the upper surfaces 684 of the panels 682. The location, size, shape and number of plates may vary from what is depicted in the figure depending on the needed organizational application. Organizational applications, such as noted above, may be located on the plates, also as described above.

In the embodiment depicted in FIG. 20, a curb side rear plate 686 may be located on an upper surface 684 of a curb side edge portion 688 of a rear panel 690. The plate 686 may have a general L-shape with a first leg 692 extending parallel the upper surface 684 and a second leg 694 extending generally transverse the first leg 692. The legs 692, 694 may be generally rectangular or square in shape, but other shapes may be permissible. In some embodiments, a lower surface 696 of the first leg 692 may be in direct contact with the rear panel 690 with no intervening structures. The rear plate 690 may be unitary, one-piece and integrally formed, or it may be comprised of one or more pieces. The rear plate 690 may be constructed of metal, such as steel, and it may generally have a constant thickness.

The second leg 694 may have one or more anchor apertures 698 extending thereto. The anchor apertures 698 may be positioned on the second leg 694 so that they align with pre-located original openings such as 126 in the vehicle wall, ribs and/or structural member. Mechanical fasteners may be located through the apertures 698 and openings 126 to secure the rear plates 686 to the vehicle as noted above.

A first street side rear plate 700 may be located substantially opposite the curb side rear plate 686 across the rear panel 690. The first street side rear plate 700 may have the same size, shape, features and function as the curb side rear plate 686. Similarly, the plate 700 may have an aperture 698 to align with a pre-located original opening 126.

A second street side rear plate 702 may be located on the upper surface 684 of the rear panel 690. In some embodiments, the plate 702 may be located on a street side rear edge portion 704. The plate 702 may have an aperture 698 to align with a pre-located, original opening 126 in the street side D-pillar 116.

In some embodiments, a first transition plate 708 is depicted connecting the rear panel 690 with an intermediate panel 706. The first transition plate 708 may be located along a passenger side portion 710 of the panels 690, 706. The first transition plate 708 may have an upper surface 712 and a lower surface 714 defining a constant thickness between them, where the lower surface 714 may be in direct contact with the upper surfaces 684 of both panels 690, 706. Mechanical fasteners 716 may be located through the first transition plate 708 into both panels 690, 706 to secure them together. In most cases, the mechanical fasteners 716 will not extend into a vehicle floor such as 104, for the reasons noted above.

A second transition plate 718, located on a street side portion 720 of the panels 690, 706, substantially opposite the first transition plate 708, may be used as well. The second transition plate 718 may be the same or similar to the first transition plate 708.

An intermediate curb side plate 722 may be located at or adjacent an intersection of the intermediate panel 706 and a forward panel 724, such as adjacent the curb side edge portion 688 of the plates 722, 724. The plate 722 may be positioned at other locations as well. The intermediate curb side plate 722 may have a shape and size, as well as features and function, like that of the curb side rear plate 686. Further, an intermediate street side plate 726 may be located substantially opposite the intermediate curb side plate 722 on the other side of the intersection. The two plates 722, 726 may be the same or they may be different as needed to accommodate pre-located existing openings, such as 152, in the vehicle.

A forward curb side plate 728 may be located on a forward curb side edge portion 688 of the forward panel 724. The forward curb side plate 728 may be substantially planar, or it may have flanges for pre-located existing openings, such as 152, and/or mechanical fasteners as described above.

A forward street side plate 730 may be located on a forward street side edge portion 720 of the forward panel 724. The forward street side plate 730 may have a primary direction that is aligned with the longitudinal axis 188 of the vehicle. In one embodiment, the forward street side plate 730 may have a fastener flange similar to those described above.

Fifth Embodiment

Figure 21:
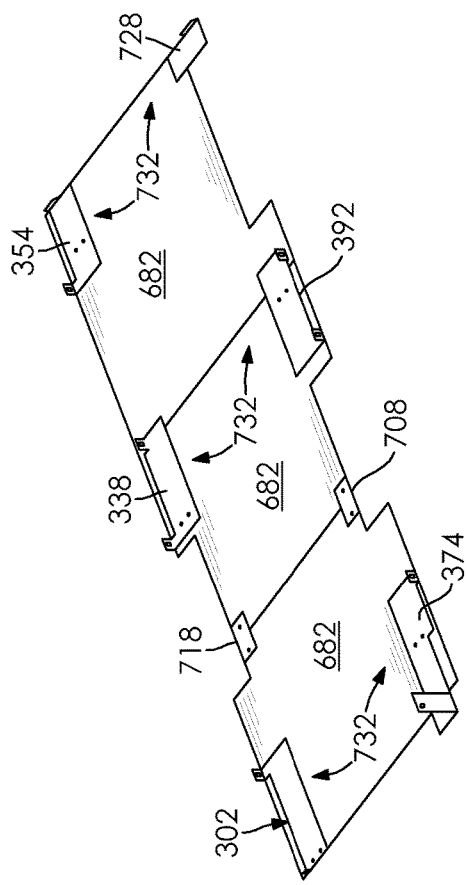
FIG. 21 is another embodiment of a mounting solution using a combination of the solution from FIGS. 5, 6, 7 and 20.

FIG. 21 is another embodiment of a mounting solution 732 using a combination of the solution 680 from FIG. 20 and the solution 284 from FIGS. 5, 6 and 7. In this embodiment, the panels 682 in the discussion of FIG. 20 may be used, as well the intermediate plates 708, 718 from the same figure. Further, the forward curb side plate 728 may also be used also from the same figure.

FIG. 21 also shows use of the curb and street side plates, 302, 338, 354, 374, 392 from the description above associated with FIGS. 5, 6 and 7. The plates 302, 338, 354, 374, 392 from the description and figures above may be located indirect facing contact over the panels 682 as shown in FIG. 21.

Sixth Embodiment

For efficiency, the sixth and seventh embodiments will use the partial vehicle interior from the second embodiment. Thus, like reference numbers will be used for related features in the figures and the description.

Figure 22:
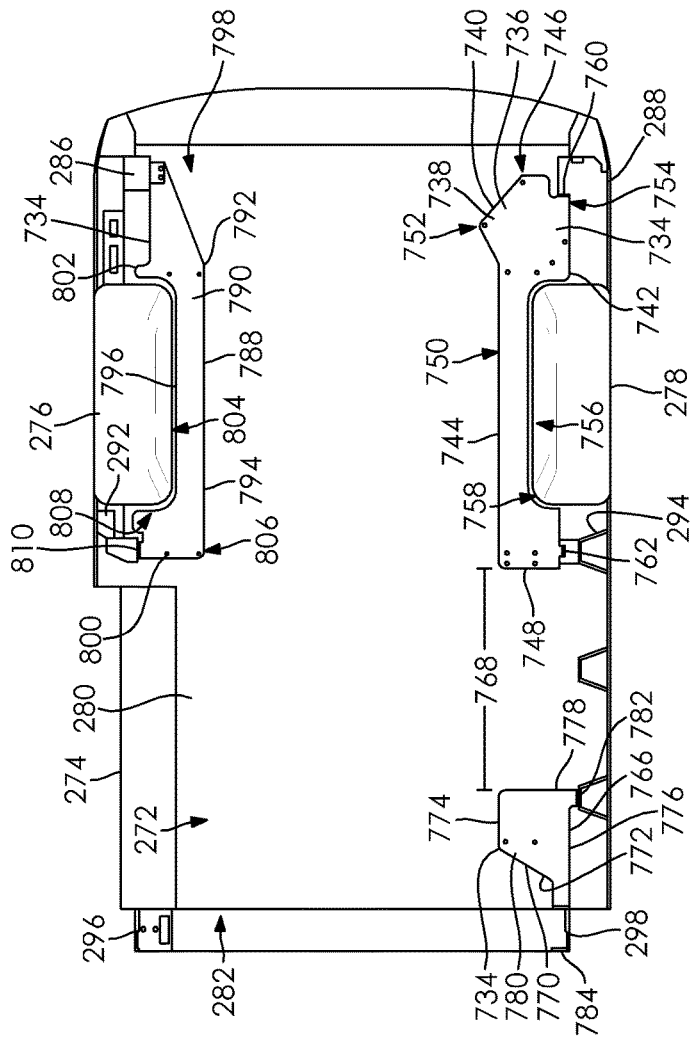
FIG. 22 is a plan view of another embodiment of a mounting solution.
Figure 23:
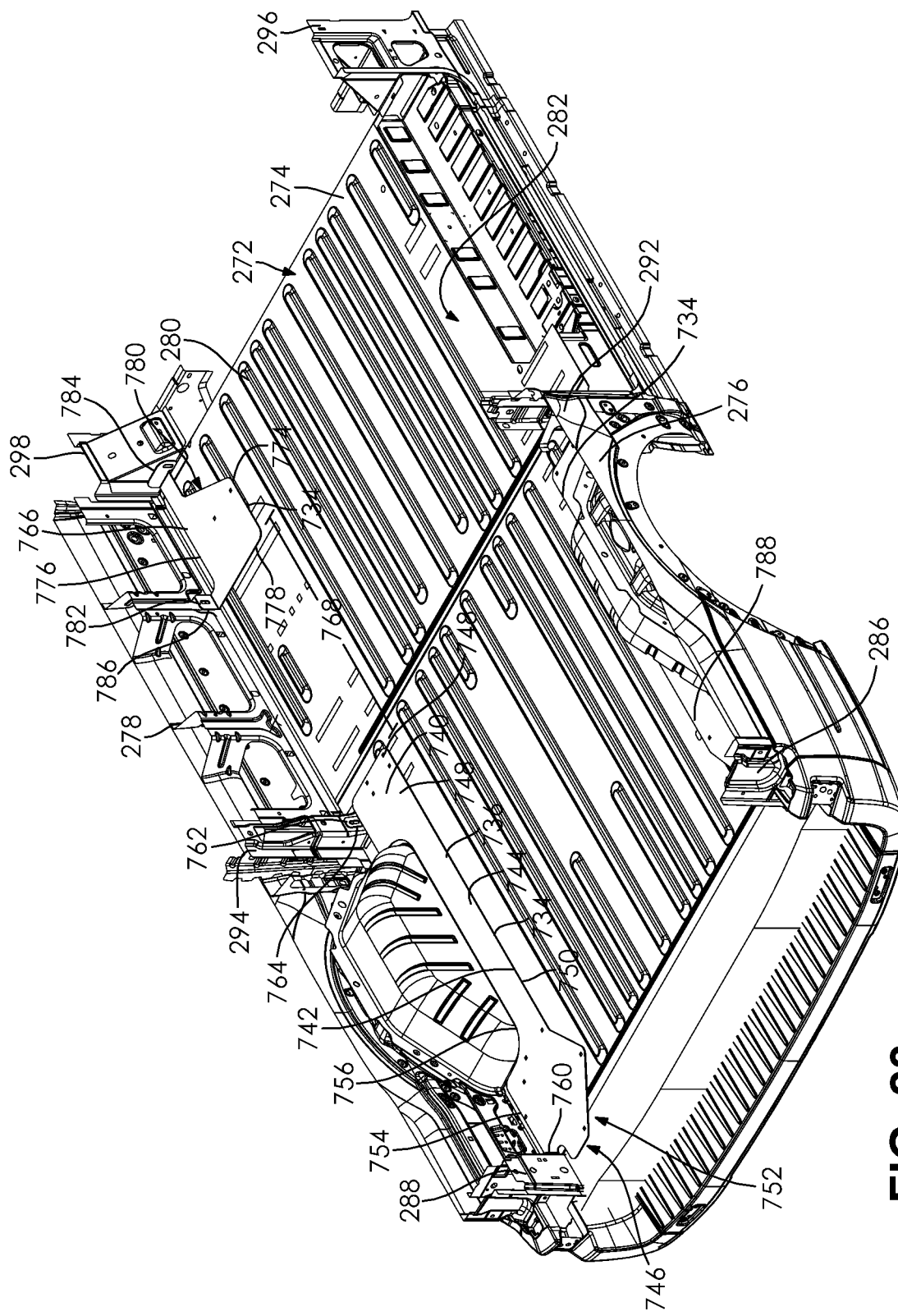
FIG. 23 is a first, upper perspective view of the mounting solution of FIG. 22.
Figure 24:
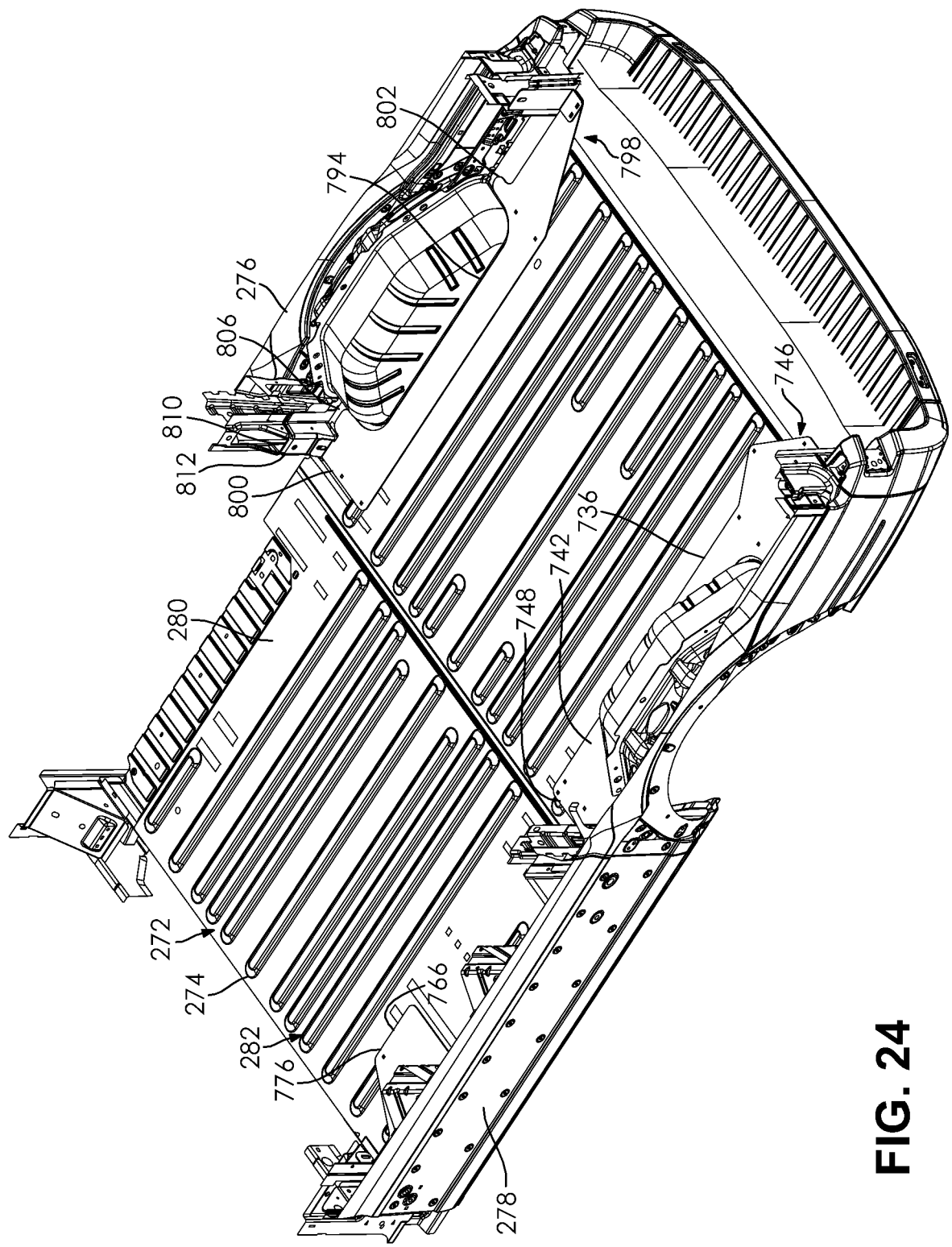
FIG. 24 is a second, upper perspective view of the mounting solution of FIG. 22.

Turning now to FIGS. 22-24, another embodiment of a partial vehicle interior 272 is depicted. In this embodiment, the vehicle 274 is a cargo van where the side door/doors, rear doors, and roof are not shown, but the side walls 276, 278, and floor 280 are partially shown. Further, the cargo areas 282 are depicted as largely empty. While one embodiment of a cargo vehicle 274 is depicted in the Figures, the mounting solution 734 described herein is not limited to only this vehicle 274, but instead, it can be used with a wide variety of vehicles and applications.

The cargo area 282 may be such as the area within the vehicle 274 from the rear doors to the passenger compartment. The rear doors are mounted to first and second D-pillars 286, 288 as noted above. The D-pillars 286, 288 serve the same purpose here as noted above, and may have the same features including the pre-located, original openings 126.

Here also there may be a side door that may be defined and framed by one or more C and B-pillars 292, 296. Opposite C and B-pillars 294, 298 may be located on the opposite, or street, side of the vehicle 274. The B and C pillars 292, 294, 296, 298 may function as noted above and have the noted features. Any of the C-pillar walls or the B-pillar walls may be provided with the plurality of original equipment manufacturer's openings 152 as noted above.

While pre-located, original openings 126, 152, which may or may not be associated with anchor devices, are noted as being associated the B, C and/or D pillars 296, 298, 292, 294, 286, 288, other locations are possible. By way of example only, it is common that the vehicle manufacturer will include openings on ribs or other robust supports for the side walls 276, 278, the floor 280 the wheel well or other features.

In order to locate and install the organizational accessories (not shown here but appreciated from the foregoing, a rear street side plate 736 may be provided. The plate 736 may be unitary, one-piece and integrally formed, or it may be comprised of one or more pieces.

The plate 736 may have planar upper and lower surfaces 738, 740 where the two surfaces 738, 740 may define a constant thickness between them. Thus, except as noted below, the plate 736 may exist in a single plane. The plate 736 may have an outboard edge 742 (e.g., streetside) and an inboard edge 744 (opposite the outboard edge) further defining the thickness. The inboard and outboard edges 308, 310 may be may terminate at a rear edge 746 to a front edge 748. The plate 736 may terminate at each of the rear and front edges 746, 748.

The inboard edge 308 may have a substantially linear portion 750 extending from the front edge 746 to adjacent a rear portion of a wheel well of the vehicle 274. A delta shaped portion 752 may extend inwardly and away from the side wall 278 and toward the longitudinal axis of the vehicle 326 rearward of the wheel well 348. The delta shaped portion 752 may abut, or be adjacent, the side wall 278 with a linear base portion 754.

The outboard edge 742 may be comprised of the linear base portion 754. It may also be comprised of a curvilinear wheel well portion 756 that extends about, such as abut or simply be adjacent, the wheel well 348. The wheel well portion 756 of the plate 736 may have a complimentary shape to the wheel well 348. Thus, it may be comprised of a substantially linear portion bounded by two curved portions.

The outboard edge 742 may also be comprised of a front wheel well portion 758 that extends in front of the wheel well 348. The outboard edge 742 in this area may be substantially linear and be located in a parallel abutting or adjacent orientation with respect to the side wall 278.

The plate 736 may have one or more anchor flanges 760, 762 connected thereto. In one embodiment, the anchor flanges 760, 762 may be unitary, integrally formed and one-piece with the plate 736. In other embodiments, one or more of the anchor flanges 760, 762 may be initially separate from, but later connected or attached to the plate 736. It may be preferred that the anchor flanges 760, 762 have the same thickness as the rest of the plate 736.

The anchor flanges 760, 762 are preferably positioned on the plate 736 so that they align with the pre-located, original openings 126, 152. By way of example, a first anchor flange 760 may be located on the rear edge 746 to align with a pre-located, original opening 126 in the street side D-pillar 288. Continuing the example, a second anchor flange 762 may be located on the outboard edge 742 of the plate 736 to align with a pre-located, original opening 152 in the C-pillar 294. In some embodiments, the pre-located, original openings 126, 152 may be co-planar with one another.

In one embodiment, the anchor flanges 760, 762 may be such as tabs that extend from the plate 736 at an angle. The extension angle may vary by location to match the angled surface in which the pre-located, original openings 126, 152 are located. In the present example, the anchor flanges 760, 762 may extend approximately transverse to the primary direction of the plate 736, which may be parallel the longitudinal axis 326 of the vehicle 274 but other angles are permissible. Each anchor flange 760, 762 may have an aperture 764 extending therethrough. Fasteners 330 may be located through the first and second anchor flange apertures 764 into the pre-located, original openings 126, 152 to secure and locate the plate 736. In some embodiments, no other structure is used to secure the plate 736 to the floor 280, or any floor structure. Thus, the floor 280 and/or the floor structure is not moved, disturbed, drilled or otherwise compromised from its original installation position and/or condition.

The rear street side plate 736 may be located directly over the floor 280. In some embodiments, the lower surface 740 of the plate 736 may be in direct face-to-face contact with an upper surface 332 of the floor 280 with no intervening structures or space. The floor 280 may be entirely planar, or it may have structures, such as ribs 324. In the case where ribs 324 are used, the lower surface 740 of the plate 736 may be in direct, face-to-face contact with an upper surface 336 of the ribs 334. Thus, the plate 736 may be substantially parallel the floor 280, on the upper surface 336 of the ribs 334. The other plates described in this embodiment, except where noted otherwise, may be in the same arrangement with the floor 280.

With continued reference to FIGS. 22-34, a front street side plate 766 may be seen. The front street side plate 766 may be separated from the rear street side plate 736 by a gap 768 where there is just open flooring.

The front street side plate 766 may have substantially planar upper and lower surfaces 770, 772 separated by a constant thickness. Thus, except as noted below, the plate 766 may exist in a single plane. The upper surface 770 may be parallel and co-planar with the upper surface 738 of the rear street side plate 736. In some embodiments, the plate 766 may be in direct contact with the floor 280 with no intervening structures, as noted above. The plate 766 may be unitary, one-piece and integrally formed, or it may be comprised of one or more pieces.

The plate 766 may have an inboard edge (e.g., curbside) 774 and outboard (e.g., streetside) edge 776 further defining the thickness. The edges 774, 776 may be linear and continuous from a rear edge 778 to a front edge 780 of the plate 766, thus the edges 778, 780 may be parallel one another. In the rear edge 778 may be parallel the front edge of the rear street side plate 736. The outboard edge 776 may be substantially parallel the side wall 278 of the vehicle 274, except as noted below. The outboard edge 776 may abut the side wall 278 or there may be a gap between them. The inboard edge 774 may define a substantially polygonal shape, such as a trapezoid, in the plate 766.

The front street side plate 766 may have a rear anchor flange 782 adjacent the intersection of the outboard edge 776 and the rear edge 778. The rear anchor flange 782 may be as described above or it may have a different size and shape.

The plate 766 may also have a front anchor flange 784, which may be located on the front edge 780. The front anchor flange 784 may extend transverse the primary direction (aligned with the longitudinal axis 326) of the plate 766; further, the front edge anchor flange 784 may extend a quarter to a half of the width of the front edge 780 of the plate 766 to match a portion, such as a side portion, of the B-pillar 298.

Each of the flanges 782, 784 may have anchor flange apertures 786 as noted above. One or more fasteners 330 may be located into the anchor flange aperture 786 and into the street side B-pillar 298 of the vehicle 274 to secure and locate the front street side plate 766 in place, as noted above. In one embodiment, the fasteners 330 may be located in the pre-loaded, original opening 152 in the B-pillar 298 so no additional apertures are needed.

Looking now at FIGS. 22 and 24, one embodiment of a rear curb side plate 788 may be seen located directly over the floor 280 in the same fashion noted above. A gap between the rear curb side plate 788 and the rear street side plate 738 where no additional related plates are located, and open flooring, may exist. The two plates 738, 788 may be located substantially directly across from one another.

As described above, the plate 788 may be in direct contact with the floor 280 with no intervening structures. The plate 788 may be unitary, one-piece and integrally formed, or it may be comprised of one or more pieces.

The plate 788 may have an upper and a lower surface 790, 792 where the two surfaces define a constant thickness between them. The plate 788 may have an inboard and outboard edge 794, 796 further defining the thickness. The plate 788 may also have a rear edge 798 and a front edge 800. The plate 788 terminates at the edges 794, 796, 798, 800.

The inboard edge 794 may extend rearwardly from the front edge 800 in a substantially linear fashion; the inboard edge 794 may be substantially parallel the vehicle axis 326. Generally around a rear edge of the wheel well 348, the inboard edge 794 may taper outwardly, away from the axis 326. The inboard edge 794 may taper to the rear edge 798.

An L-bracket may be attached to the rear edge 798, such as with fasteners but other attachment concepts may be used. One leg of the L-bracket may rest directly on the upper surface 790 while the other leg may be in direct contact with the D-pillar 286. Fasteners may extend through the leg into the D-pillar to secure it in place.

The outboard edge 796 may extend from the rear edge 798 generally parallel the side wall 276, but spaced therefrom. A finger 802 may extend from the outboard edge 796. The finger 802 may extend generally parallel a rear edge of the wheel well 348.

The outboard edge 796 may have a curvilinear wheel well portion 804 that extends about, such as abut or simply be adjacent, the wheel well 348. The wheel well portion 804 of the plate 788 may have a complimentary shape to the wheel well 348. Thus, it may be comprised of a substantially linear portion bounded by two curved portions, where one of the curved portions may be the finger 802.

The outboard edge 796 may also define a forward portion 806 of the plate 788. The forward portion 806 of the plate 788 may have an outwardly extending portion 808 that at least partially wraps around a front edge of the wheel well 348. The forward portion includes the front edge 800.

The plate 788 may have one or more anchor flanges 810 connected thereto. In one embodiment, the anchor flange 810 may be unitary, integrally formed and one-piece with the plate 788. In other embodiments, one or more of the anchor flanges 810 may be separately connected or attached to the plate 788. It may be preferred that the anchor flange 810 has the same thickness as the rest of the plate 788. Each flange 788 may be formed from two opposite surfaces that are parallel one another.

The anchor flange 788 is preferably aligned with the C-pillar 292 so that it is aligned with the pre-located, original openings 152. By way of example, the anchor flange 810 may be located adjacent an intersection of the front edge 800 and the outboard edge 796 to align with the pre-located, original opening 152. The first anchor flange 788 may extend substantially transverse the primary direction (which may be parallel the longitudinal axis 326 of the vehicle 274) of the plate 788. Fasteners 330 may be located through an aperture 812 in the anchor flanges 788 and into the pre-located, original opening 152 to secure and locate the plate 780.

Seventh Embodiment

As noted above, for efficiency, the sixth and seventh embodiments will use the partial vehicle interior from the second embodiment. Thus, like reference numbers will be used for related features in the figures and the description.

Figure 25:
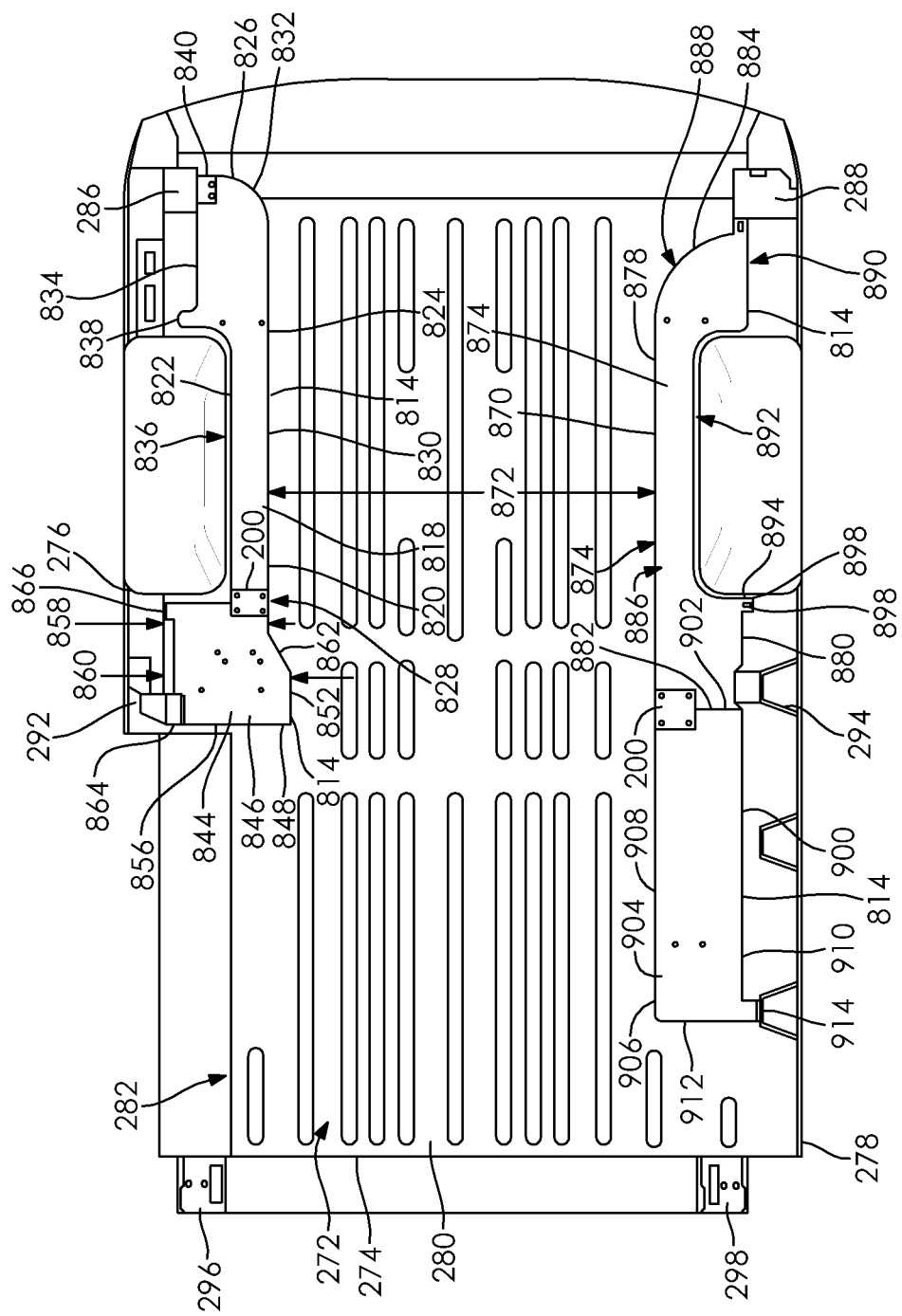
FIG. 25 is a plan view of another embodiment of a mounting solution.
Figure 26:
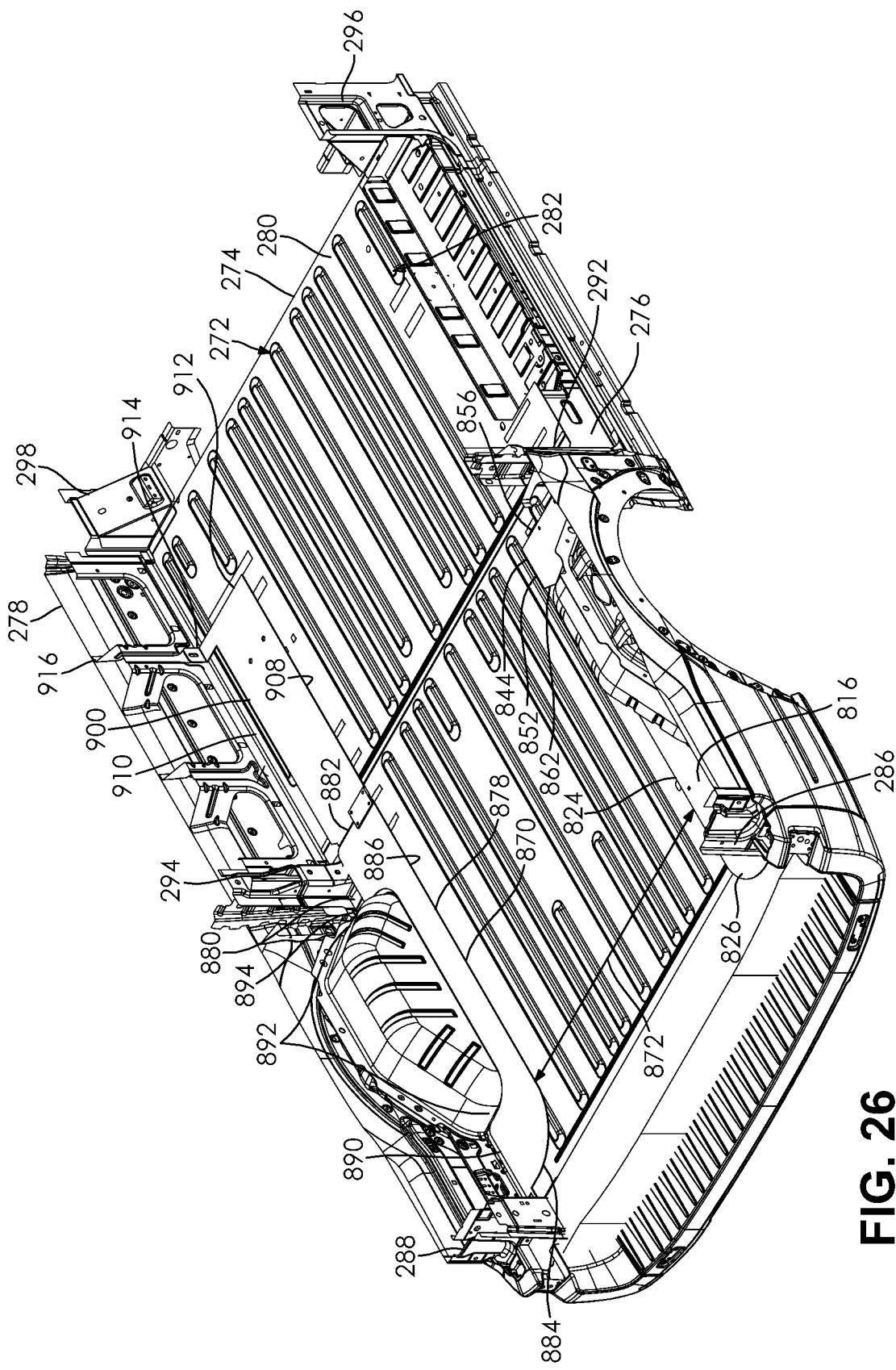
FIG. 26 is a first, upper perspective view of the mounting solution of FIG. 25.
Figure 27:
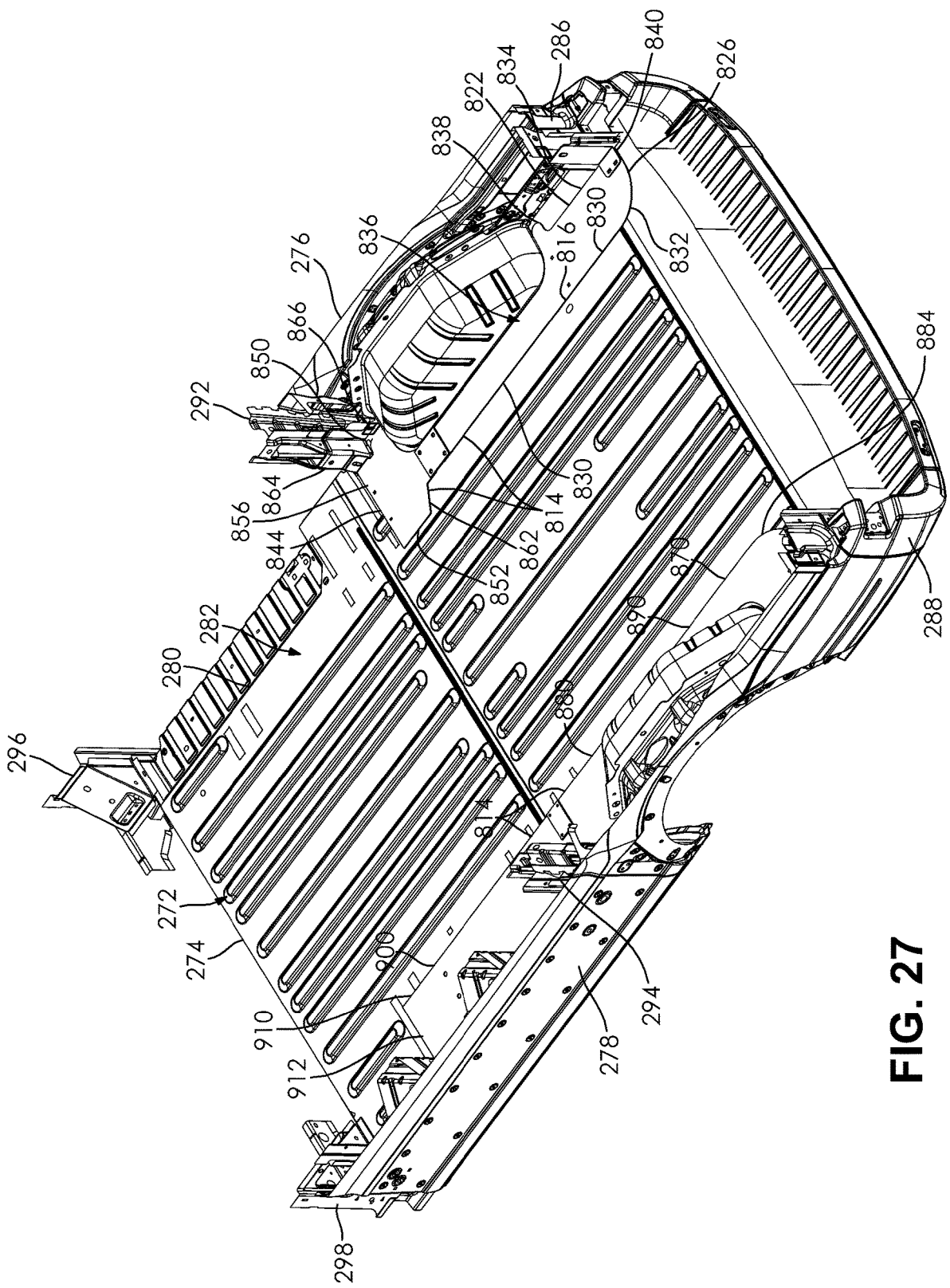
FIG. 27 is a second, upper perspective view of the mounting solution of FIG. 25.

Turning now to FIGS. 25-27, another embodiment of a partial vehicle interior 272 is depicted. In this embodiment, the vehicle 274 is a cargo van where the side door/doors, rear doors, and roof are not shown, but the side walls 276, 278, and floor 280 are partially shown. Further, the cargo areas 282 are depicted as largely empty. While one embodiment of a cargo vehicle 274 is depicted in the Figures, the mounting solution 814 described herein is not limited to only this vehicle 274, but instead, it can be used with a wide variety of vehicles and applications.

The cargo area 282 may be such as the area within the vehicle 274 from the rear doors to the passenger compartment. The rear doors are mounted to first and second D-pillars 286, 288 as noted above. The D-pillars 286, 288 serve the same purpose here as noted above, and may have the same features including the pre-located, original openings 126.

Here also there may be a side door that may be defined and framed by one or more C and B-pillars 292, 296. Opposite C and B-pillars 294, 298 may be located on the opposite, or street, side of the vehicle 274. The B and C pillars 292, 294, 296, 298 may function as noted above and have the noted features. Any of the C-pillar walls or the B-pillar walls may be provided with the plurality of original equipment manufacturer's openings 152 as noted above.

While pre-located, original openings 126, 152, which may or may not be associated with anchor devices, are noted as being associated the B, C and/or D pillars 296, 298, 292, 294, 286, 288, other locations are possible. By way of example only, it is common that the vehicle manufacturer will include openings on ribs or other robust supports for the side walls 276, 278, the floor 280 the wheel well or other features.

In order to locate and install the organizational accessories (not shown here but appreciated from the foregoing, a rear curb side plate 816 may be provided. The plate 816 may be unitary, one-piece and integrally formed, or it may be comprised of one or more pieces.

The plate 816 may have planar upper and lower surfaces 818, 820 where the two surfaces 818, 820 may define a constant thickness between them. Thus, except as noted below, the plate 816 may exist in a single plane. The plate 816 may have an outboard edge 822 (e.g., streetside) and an inboard edge 824 (opposite the outboard edge) further defining the thickness. The inboard and outboard edges 822, 824 may be may terminate at a rear edge 826 and a front edge 826. The plate 816 may terminate at each of the edges 822, 824, 826, 828.

The inboard edge 824 may have a substantially linear portion 830 extending from the front edge 828 to adjacent the curb side D pillar 286 of the vehicle 274. The inboard edge 824 may transition to the rear edge 826 via a radiused portion 832.

From the rear edge 826, the outboard edge 822 may have a substantially linear portion 834. The linear portion 834 may extend to a curvilinear wheel well portion 836 that extends at least partially about, such as abut or simply be adjacent, the wheel well 348. The wheel well portion 836 of the plate 816 may have a complimentary shape to at least a portion of the wheel well 348. The wheel well portion 836 may be comprised of a rear finger portion 838 that may extend at least partially along a rear portion of the wheel well 348. The balance of the wheel well portion 836 may be substantially linear and substantially parallel with the inboard edge 824.

The inboard and outboard edges 824, 822 may be coterminus. Thus, in some embodiments, they may both terminate at the front edge 828, where the front edge 828 may be substantially linear, but extend transverse the inboard and outboard edges 824, 822.

In some embodiments, an L-bracket 840 may be attached to the outboard edge 822 near the rear edge 826, such as with fasteners, but other attachment concepts may be used. One leg of the L-bracket may rest directly on the upper surface 818 while the other leg may be in direct contact with the D-pillar 286. Fasteners may extend through the leg into the D-pillar to secure it in place.

With continued reference to FIGS. 25-27, a transition plate 200 is depicted connecting the rear street curb plate 816 and a front curb side plate 844. The transition plate 200 may be as described above.

The front curb side plate 844 may have planar upper and lower surfaces 846, 848 where the two surfaces 846, 848 may define a constant thickness between them. Thus, except as noted below, the plate 844 may exist in a single plane. The plate 844 may have an outboard edge 850 (e.g., streetside) and an inboard edge 852 (opposite the outboard edge) further defining the plate 844. The inboard and outboard edges 850, 852 may be may terminate at a rear edge 854 and a front edge 856. The plate 844 may terminate at each of the edges 850, 852, 854, 856.

The rear edge 854 may be substantially linear and extend generally transverse the longitudinal axis 326 of the vehicle 274. The transition plate 200 may be connected along the rear edge 854.

The inboard and outboard edges 852, 850 may define a first width 858 of the plate 844 and a second width 860 of the plate 844. The first width 858 may be narrower than the second width 860. An angled transition portion 862 along the inboard edge 852 may expand the perimeter of the plate to accommodate the additional width. The angled transition portion 862 may connect the substantially linear portions of the inboard edge 852 defining the first and second widths 858, 860.

The inboard and outboard edges 852, 850 may be coterminous with the front edge 856. The front edge 856 may be substantially transverse the inboard and outboard edges 852, 850, except for the transition portion 862.

The plate 844 may have one or more anchor flanges 864, 866 connected thereto. In one embodiment, the anchor flanges 864, 866 may be unitary, integrally formed and one-piece with the plate 844. In other embodiments, one or more of the anchor flanges 864, 866 may be initially separate from, but later connected or attached to the plate 844. It may be preferred that the anchor flanges 864, 866 have the same thickness as the rest of the plate 844.

The anchor flanges 864, 866 are preferably positioned on the plate 844 so that they align with a pre-located, original opening 152. By way of example, a first anchor flange 764 may be located near the intersection of the front edge 856 and the outboard edge 850 to align with a pre-located, original opening 152 in the curb side C-pillar 142. Continuing the example, a second anchor flange 866 may be located on the outboard edge 850 of the plate 844 to align with a pre-located, original opening 324 in the curb side wall 276. In some embodiments, the pre-located, original openings 152, 324 may be vertically co-planar with one another.

In one embodiment, the anchor flanges 864, 866 may be such as tabs that extend from the plate 844 at an angle. The extension angle may vary by location to match the angled surface in which the pre-located, original openings 152, 324 are located. In the present example, the anchor flanges 864, 866 may extend approximately transverse to the primary direction of the plate 844, which may be parallel the longitudinal axis 326 of the vehicle 274, but other angles are permissible. Each anchor flange 864, 866 may have an aperture 868 extending therethrough. Fasteners 330 may be located through the first and second anchor flange apertures 868 into the pre-located, original openings 152, 324 to secure and locate the plate 844.

In some embodiments, no other structure is used to secure the plates 816, 844 to the floor 280, or any floor structure. Thus, the floor 280 and/or the floor structure is not moved, disturbed, drilled or otherwise compromised from its original installation position and/or condition.

The plates 816, 844 may be located directly over the floor 280. In some embodiments, the lower surfaces 820, 848 of the plate 816, 844 may be in direct face-to-face contact with an upper surface 332 of the floor 280 with no intervening structures or space. The floor 280 may be entirely planar, or it may have structures, such as ribs 324. In the case where ribs 324 are used, the lower surfaces 820, 848 of the plates 816, 844 may be in direct, face-to-face contact with an upper surface 336 of the ribs 334. Thus, the plates 816, 844 may be substantially parallel the floor 280, on the upper surface 336 of the ribs 334. The other plates described in this embodiment, except where noted otherwise, may be in the same arrangement with the floor 280.

With continued reference to FIGS. 25-27, a rear street side plate 870 may be seen. The rear street side plate 870 may be separated from the rear curb side plate 816 by a gap 872 where there is just open flooring and no plates extend.

The rear street side plate 870 may have substantially planar upper and lower surfaces 874, 876 separated by a constant thickness. Thus, except as noted below, the plate 870 may exist in a single plane. The upper surface 874 may be parallel and co-planar with the upper surface 818 of the rear curb side plate 816. In some embodiments, the plate 870 may be in direct contact with the floor 280 with no intervening structures, as noted above. The plate 870 may be unitary, one-piece and integrally formed, or it may be comprised of one or more pieces.

The plate 870 may have an inboard edge (e.g., curbside) 878, an outboard (e.g., streetside) edge 880, a front edge 882 and a rear edge 884.

The inboard edge 878 may have a substantially linear portion 886 extending from the front edge 882 to adjacent the street side D pillar 288 of the vehicle 274. The inboard edge 878 may transition to the rear edge 884 via a radiused portion 888.

From the rear edge 884, the outboard edge 880 may have a substantially linear portion 890. The linear portion 890 may extend to a curvilinear wheel well portion 892 that extends at least partially about, such as abut or simply be adjacent, the wheel well 348. The wheel well portion 892 of the plate 870 may have a complimentary shape to at least a portion of the wheel well 348. The wheel well portion 892 may be comprised of a forward finger portion 894 that may extend at least partially along a forward portion of the wheel well 348. The balance of the wheel well portion 836 may be substantially linear and substantially parallel with the inboard edge 878.

The inboard and outboard edges 878, 880 may be co-terminus. Thus, in some embodiments, they may both terminate at the front edge 882, where the front edge 882 may be substantially linear, but extend transverse the inboard and outboard edges 878, 880.

The rear street side plate 870 may have a front anchor flange 896 adjacent a front portion of the wheel well 348. The front anchor flange 896 may be unitary, integrally formed and one-piece with the plate 870. In other embodiments, the anchor flanges 896 may be initially separate from, but later connected or attached to the plate 870. It may be preferred that the anchor flange 896 have the same thickness as the rest of the plate 870.

The anchor flange 896 is preferably positioned on the plate 870 so that it aligns with a pre-located, original opening 324 in a side wall 132.

The anchor flange 896 may be such as a tab that extends from the plate 870 at an angle. The extension angle may vary by location to match the angled surface in which the pre-located, original opening 324 is located. In the present example, the anchor flanges 896 may extend approximately transverse to the primary direction of the plate 870, which may be parallel the longitudinal axis 326 of the vehicle 274, but other angles are permissible. The anchor flange 896 may have an aperture 896 extending therethrough. Fasteners 330 may be located through the anchor flange aperture 896 into the pre-located, original opening 324 to secure and locate the plate 870.

The rear street side plate 870 may have substantially planar upper and lower surfaces 874, 876 separated by a constant thickness. Thus, except as noted below, the plate 870 may exist in a single plane. The upper surface 874 may be parallel and co-planar with the upper surface 818 of the rear curb side plate 816. In some embodiments, the plate 870 may be in direct contact with the floor 280 with no intervening structures, as noted above. The plate 870 may be unitary, one-piece and integrally formed, or it may be comprised of one or more pieces.

The plate 870 may have an inboard edge (e.g., curbside) 878, an outboard (e.g., streetside) edge 880, a front edge 882 and a rear edge 884.

The inboard edge 878 may have a substantially linear portion 886 extending from the front edge 882 to adjacent the street side D pillar 288 of the vehicle 274. The inboard edge 878 may transition to the rear edge 884 via a radiused portion 888.

From the rear edge 884, the outboard edge 880 may have a substantially linear portion 890. The linear portion 890 may extend to a curvilinear wheel well portion 892 that extends at least partially about, such as abut or simply be adjacent, the wheel well 348. The wheel well portion 892 of the plate 870 may have a complimentary shape to at least a portion of the wheel well 348. The wheel well portion 892 may be comprised of a forward finger portion 894 that may extend at least partially along a forward portion of the wheel well 348. The balance of the wheel well portion 836 may be substantially linear and substantially parallel with the inboard edge 878.

The inboard and outboard edges 878, 880 may be co-terminus. Thus, in some embodiments, they may both terminate at the front edge 882, where the front edge 882 may be substantially linear, but extend transverse the inboard and outboard edges 878, 880.

The rear street side plate 870 may have a front anchor flange 896 adjacent a front portion of the wheel well 348. The front anchor flange 896 may be unitary, integrally formed and one-piece with the plate 870. In other embodiments, the anchor flanges 896 may be initially separate from, but later connected or attached to the plate 870. It may be preferred that the anchor flange 896 have the same thickness as the rest of the plate 870.

The anchor flange 896 is preferably positioned on the plate 870 so that it aligns with a pre-located, original opening 324 in a side wall 132.

The anchor flange 896 may be such as a tab that extends from the plate 870 at an angle. The extension angle may vary by location to match the angled surface in which the pre-located, original opening 324 is located. In the present example, the anchor flanges 896 may extend approximately transverse to the primary direction of the plate 870, which may be parallel the longitudinal axis 326 of the vehicle 274, but other angles are permissible. The anchor flange 896 may have an aperture 896 extending therethrough. Fasteners 330 may be located through the anchor flange aperture 896 into the pre-located, original opening 324 to secure and locate the plate 870.

A transition plate 200, as described above, is depicted connecting the rear street side plate 870 and a front street side plate 900. The transition plate 200 may as described above. The transition plate 200 may connect adjacent the front edge of the 882 of the rear street side plate 870 and a rear edge 903 of the front street side plate 900.

With continued reference to the same figures, one embodiment of the front street side plate 900 may be seen located directly over the floor 280 in the same fashion noted above. A gap between the front curb side plate 844 and the front street side plate 900 where no additional related plates are located, and open flooring, may exist.

As described above, the plate 900 may be in direct contact with the floor 280 with no intervening structures. The plate 900 may be unitary, one-piece and integrally formed, or it may be comprised of one or more pieces.

The plate 900 may have an upper and a lower surface 904, 906 where the two surfaces define a constant thickness between them. The plate 900 may have an inboard and outboard edge 908, 910 defining the shape of the plate. The plate 900 may also have the rear edge 902 and a front edge 912. The plate 900 terminates at the edges 902, 908, 910, 912.

The inboard edge 908 may extend rearwardly from the front edge 912 in a substantially linear fashion; the inboard edge 908 may be substantially parallel the vehicle axis 326. The inboard edge 908 and the outboard edge 910 may be coterminous with the rear edge 902. The rear edge 902 may be substantially linear and extend transverse the inboard edge 908 and the outboard edge 910.

The outboard edge 910 may extend from the rear edge 902 generally parallel the side wall 132, but spaced therefrom. The outboard edge 910 and the inboard edge 908 may extend substantially parallel one another. Thus, the plate 900 may define a substantially rectangular shape or perimeter.

The plate 900 may have one or more anchor flanges 914 connected thereto. In one embodiment, the anchor flange 914 may be unitary, integrally formed and one-piece with the plate 900. In other embodiments, the anchor flange 914 may be separately connected or attached to the plate 900. It may be preferred that the anchor flange 914 has the same thickness as the rest of the plate 900. Each flange 914 may be formed from two opposite surfaces that are parallel one another.

The anchor flange 914 is preferably aligned with a pre-located, original openings 324 in the side wall 132. By way of example, the anchor flange 914 may be located adjacent an intersection of the front edge 912 and the outboard edge 910 to align with the pre-located, original opening 324. The anchor flange 914 may extend substantially transverse the primary direction (which may be parallel the longitudinal axis 326 of the vehicle 274) of the plate 900. Fasteners 330 may be located through an aperture 916 in the anchor flanges 914 and into the pre-located, original opening 324 to secure and locate the plate 900.

As with the other plates noted above, in some embodiments, no other structure is used to secure the plate 900 to the floor 280, or any floor structure. Thus, the floor 280 and/or the floor structure is not moved, disturbed, drilled or otherwise compromised from its original installation position and/or condition.

The plate 900 may be located directly over the floor 280. In some embodiments, the lower surface 906 of the plate 900 may be in direct face-to-face contact with an upper surface 332 of the floor 280 with no intervening structures or space. The floor 280 may be entirely planar, or it may have structures, such as ribs 324. In the case where ribs 324 are used, the lower surface 906 of the plate 900 may be in direct, face-to-face contact with an upper surface 336 of the ribs 334. Thus, the plates 900 may be substantially parallel the floor 280, on the upper surface 336 of the ribs 334. The other plates described in this embodiment, except where noted otherwise, may be in the same arrangement with the floor 280.

In accordance with the provisions of the patent statutes, the device and system has been described in what is considered to represent its preferred embodiments. However, it should be noted that the device and system can be practiced otherwise than as specifically illustrated and described without departing from its spirit or scope.

What is claimed is:

1. A method for mounting structures to a vehicle, comprising:
   providing an anchor point, the anchor point comprised of an anchor point aperture in a structural member;
   securing a plate to the anchor point by aligning an aperture in an anchor flange of the plate with the anchor point aperture; and
   locating a fastener through the anchor flange aperture and the anchor point aperture to secure the plate to the anchor point;
   wherein a lower surface of the plate is placed in direct facing contact with an upper surface of a floor, and a lower surface of the floor is on an exterior of the vehicle.

2. The method of claim 1, wherein the fastener is threaded into the anchor point aperture.

3. The method of claim 1, wherein an upper surface of the plate is located below the anchor point aperture when the anchor flange aperture is aligned with the anchor point aperture.

4. The method of claim 1, wherein the anchor flange is angled with respect to the upper surface of the plate to align with the structural member in which the anchor point aperture is located.

5. The method of claim 3, further comprising attaching an organizational application to an upper surface of the plate such that no attachment device from the organizational application extends through a floor.

6. A method for mounting structures to a vehicle, comprising:
   providing a plurality of anchor points in a plurality of structural members, the anchor points each comprised of an anchor point aperture, wherein the plurality of anchor points are coplanar with one another;
   locating a first plate having a substantially planar upper surface and a substantially planar lower surface on a floor deck so that the lower surface is in direct facing contact with an upper surface of the floor deck, and the upper surface of the first plate is below the plurality of anchor points;

locating a second plate having a substantially planar upper surface and a substantially planar lower surface on the floor deck so the upper and lower surfaces of the second plate are substantially coplanar with the first plate;

aligning an aperture in an angled anchor point flange on each plate with one of the anchor point apertures; and connecting each plate with one of the anchor points by locating a fastener through each anchor point flange aperture into a respective anchor point aperture.

7. A system for mounting structures to a vehicle, comprising:

an anchor point in a structural member of the vehicle, the anchor point having an anchor point aperture;

a plate having an upper surface and a lower surface, an anchor flange extending at an angle with respect to the upper surface, the anchor flange having an anchor flange aperture therein, wherein the anchor flange aperture is aligned with the anchor point aperture;

a fastener extending through the anchor flange aperture and the anchor point aperture to secure the plate to the anchor point.

8. The system of claim 7, wherein the plate has substantially planar upper and lower surfaces that define a substantially constant thickness between them along the plate.

9. The system of claim 8, wherein the lower surface of the plate is located in direct facing contact with an upper surface of a floor of the vehicle, wherein a lower surface of the floor is on an exterior of the vehicle.

10. The system of claim 8, wherein the lower surface of the plate is coplanar with the upper surface of the vehicle floor.

11. The system of claim 8, wherein the plate terminates at the lower surface and the anchor flange extends above the upper surface.

12. The system of claim 8, wherein the plate, or any structure located through the plate, does not extend into the floor.

13. The system of claim 8, wherein the upper and lower surfaces of the plate are substantially solid and continuous.

14. The system of claim 8, wherein the plate is one-piece, unitary and integrally formed.

15. The system of claim 7, wherein the anchor point aperture has a first set of threads and the fastener has a second set of threads complementary to the first set of threads.

16. The system of claim 7, wherein the anchor flange is located on a rear edge, a side edge or a front edge of the plate.

17. The system of claim 7, wherein the plate has a single anchor flange.

18. The system of claim 7, wherein the plate has an inner side edge and outer side edge.

19. The system of claim 18, wherein an intersection of the inner side edge with an upper surface of a floor a straight line.

20. The system of claim 18, wherein the inner and outer side edges are parallel one another.

21. The system of claim 18, wherein the inner side edge is adjacent a side wall of the vehicle.

22. The system of claim 18, wherein the inner edge is partially curvilinear and partially straight.

23. The system of claim 8, wherein a foot of an organizational application rests on the upper surface of the plate, the foot is attached to the plate such that no attachment devices from the foot to the plate extend into a layer below the lower surface of the plate.

24. A system for mounting structures to a vehicle, comprising:

an anchor point in each of two structural members, each anchor point having an anchor point aperture;

a first plate having an upper surface and a lower surface, the lower surface located in direct facing contact with an upper surface of a floor deck of the vehicle;

a second plate having an upper surface and a lower surface, the lower surface located in direct facing contact with the upper surface of the floor deck of the vehicle, the second plate being coplanar with the first plate;

wherein the upper surfaces of the first plate and the second plate are located below the anchor points at a substantially equal distance;

a first anchor flange extending at a first angle with respect to the upper surface of the first plate, the first anchor flange having an anchor flange aperture therein, wherein the first anchor flange aperture is aligned with one anchor point aperture;

a second anchor flange extending at a second angle with respect to the upper surface of the second plate, the second anchor flange having anchor flange aperture therein, wherein the first angle is different than the second angle, wherein the second anchor flange aperture is aligned with one anchor point aperture;

a fastener extending through each anchor flange aperture and each anchor point aperture to secure each respective plate to the respective anchor point.

25. The system of claim 24, wherein a first foot of an organizational application rests on the upper surface of the first plate and a second foot of the organizational application rests on the upper surface of the first plate, wherein the feet are attached to the plate such that no attachment devices from the feet to the plate extend into the floor.

26. The system of claim 24, wherein a first foot of an organizational application rests on the upper surface of the first plate and a second foot of the organizational application rests on the upper surface of the second plate, wherein the feet are attached to the plates such that no attachment devices from the feet to the plates extend into the floor.

27. The system of claim 24, further comprising a third plate, the third plate having an upper and a lower surface, wherein the lower surface is located on an upper surface of a wheel well, the third plate having a third anchor flange extending at a third angle with respect to the upper surface, the third anchor flange having an anchor flange aperture therein, the anchor flange being aligned with an anchor point aperture a third structural member, and a fastener extending through the anchor flange aperture and each anchor point aperture to secure the third plate to the anchor point.

* * * * *